(12) United States Patent
Lee

(10) Patent No.: US 12,725,117 B2
(45) Date of Patent: Sep. 1, 2026

(54) AUXILIARY VERIFICATION SYSTEM OF GREENHOUSE GAS INVENTORY

(71) Applicant: Alfa Digital Co., Ltd., New Taipei City (TW)

(72) Inventor: Elim Lee, New Taipei City (TW)

(73) Assignee: Alfa Digital Co., Ltd., New Taipei City (TW)

( * ) Notice: Subject to any disclaimer, the term of this patent is extended or adjusted under 35 U.S.C. 154(b) by 28 days.

(21) Appl. No.: 18/818,619

(22) Filed: Aug. 29, 2024

(65) Prior Publication Data

US 2025/0037074 A1 Jan. 30, 2025

Related U.S. Application Data

(63) Continuation-in-part of application No. 18/501,043, filed on Nov. 3, 2023, now abandoned.

(30) Foreign Application Priority Data

Jul. 28, 2023 (TW) ................................ 112128479
Apr. 18, 2024 (TW) ................................ 113114493

(51) Int. Cl.
*G06Q 10/08* (2024.01)
*G06F 40/247* (2020.01)
(Continued)

(52) U.S. Cl.
CPC ......... *G06Q 10/087* (2013.01); *G06F 40/247* (2020.01); *G06F 40/58* (2020.01); *G06V 30/14* (2022.01)

(58) Field of Classification Search
CPC ..................................................... G06Q 10/06
See application file for complete search history.

(56) References Cited

U.S. PATENT DOCUMENTS

2012/0084193 A1* 4/2012 Marino .................. G06Q 40/04 705/37
2013/0018696 A1* 1/2013 Meldrum ......... G06Q 10/06315 705/348

(Continued)

FOREIGN PATENT DOCUMENTS

WO WO-2019193583 A2 * 10/2019 ............. H04L 63/12
WO WO-2024258680 A1 * 12/2024 ............. G06Q 10/06

OTHER PUBLICATIONS

Abby Snyder, Scope 1 & 2 GHG Inventory Guidance: Use to prepare a GHG inventory and quantify emissions, Innovation Center for U.S. Dairy, Nov. 2019. (Year: 2019).*

*Primary Examiner* — Kurtis Gills
(74) *Attorney, Agent, or Firm* — Bruce Stone LLP; Joseph A. Bruce

(57) ABSTRACT

An auxiliary verification system of greenhouse gas inventory can receive raw data from a verified unit end and includes a verification database, a computing module, and a verification module. The computing module searches from the verification database for a GWP value and a GHG emission factor according to a part of data fields of an inventory item of the raw data, to calculate a second GHG emission value. The verification module checks whether or not a first verified GHG emission value of the inventory item is the same as the second GHG emission value. Through such automatic verification, it is possible to save labor and required time greatly, simplify the work process, and allow the verification of 100% of inventory items of the raw data.

10 Claims, 26 Drawing Sheets

(51) Int. Cl.

| | |
|---|---|
| ***G06F 40/58*** | (2020.01) |
| ***G06Q 10/087*** | (2023.01) |
| ***G06V 30/14*** | (2022.01) |

(56) References Cited

U.S. PATENT DOCUMENTS

| | | | | |
|---|---|---|---|---|
| 2019/0311443 | A1* | 10/2019 | Blades | H04L 9/3239 |
| 2023/0395199 | A1* | 12/2023 | Rakshit | B01J 35/39 |
| 2024/0028599 | A1* | 1/2024 | Aurongzeb | G06F 16/24575 |
| 2024/0220285 | A1* | 7/2024 | Anderson | G06Q 50/40 |
| 2024/0403895 | A1* | 12/2024 | Menon | G06Q 10/06 |

* cited by examiner

| CAT 1 | CAT 2 | CAT 3 |
| --- | --- | --- |
| direct GHG emission and removal | indirect GHG emissions from imported energy | indirect GHG emissions from transportation |
| stationary fuel combustion source | electricity | upstream transportation and distribution |
| mobile fuel combustion source | thermal energy | downstream transportation and distribution |
| process of manufacturing for industry | steam | employee commuting |
| fugitive emission | compressed air | client/visitor transport |
| Land use, land-use change, and forestry | coal gas | business travel |
| CAT 4 | CAT 5 | CAT 6 |
| indirect GHG emissions from products used by organizations | indirect GHG emissions related to use of products from organization | indirect GHG emissions from other sources |
| purchased goods | use of products | others |
| capital goods | downstream leased assets | — |
| waste treatment | final treatment of products | — |
| leased assets | investment | — |
| others (consulting, cleaning, maintenance, mail delivery, banking, etc.) | — | — |

FIG.5

<table>
<tr><td colspan="7">CAT 1: direct GHG emission and removal</td></tr>
<tr><td></td><td>stationary fuel combustion source</td><td>mobile fuel combustion source</td><td>process emission</td><td>fugitive emission</td><td>land-use change</td><td>total (tCO2e)</td></tr>
<tr><td>total emission</td><td>11.1348</td><td>0</td><td>0</td><td>302.9400</td><td>0</td><td>314.0748</td></tr>
<tr><td>percentage (%)</td><td>3.55%</td><td>0</td><td>0</td><td>96.45</td><td>0</td><td>100</td></tr>
<tr><td colspan="7">CAT 2: indirect GHG emissions from imported energy</td></tr>
<tr><td></td><td colspan="2">input electricity</td><td colspan="2">input energy</td><td colspan="2">total(tCO2e)</td></tr>
<tr><td>total emission</td><td colspan="2">417.5225</td><td colspan="2">0</td><td colspan="2">417.5225</td></tr>
<tr><td>percentage (%)</td><td colspan="2">100</td><td colspan="2">0</td><td colspan="2">100</td></tr>
<tr><td colspan="7">CAT 3: indirect GHG emissions from transportation</td></tr>
<tr><td></td><td>upstream transportation and distribution</td><td>downstream transportation</td><td>employee commuting</td><td>client/visitor transport</td><td>business travel</td><td>total (tCO2e)</td></tr>
<tr><td>total emission</td><td>130.6897</td><td>0</td><td>0.0311</td><td>0.0062</td><td>2.0877</td><td>132.8147</td></tr>
<tr><td>percentage (%)</td><td>98.40</td><td>0</td><td>0.02</td><td>0</td><td>1.57</td><td>100</td></tr>
</table>

FIG.6A

| CAT 4: indirect GHG emissions from products used by organizations | | | | | | |
|---|---|---|---|---|---|---|
| | purchased goods | capital goods | waste treatment | upstream leased | purchased service | total (tCO2e) |
| total emission | 75.4034 | 0 | 0.0190 | 0 | 0 | 75.4224 |
| percentage (%) | 99.97 | 0 | 0.03 | 0 | 0 | 100 |

| CAT 5: indirect GHG emissions associated with the use of products from the organization | | | | | | |
|---|---|---|---|---|---|---|
| | downstream leased assets | investment management | use of goods | waste treatment | financing activities | total (tCO2e) |
| total emission | 51.4768 | 0 | 0 | 0 | 0 | 51.4768 |
| percentage (%) | 100 | 0 | 0 | 0 | 0 | 100 |

| CAT 6: indirect GHG emissions from other sources | | |
|---|---|---|
| | other sources | total(tCO2e) |
| total emission | 0 | 0 |
| percentage (%) | 0 | 0 |

| total CO2 from bioenergy source | |
|---|---|
| | total(tCO2e) |
| total emission | 991.3112 |

FIG.6B

| | |
|---|---|
| power supply | 220V three-phase 60Hz |
| climate type | TYPE T1 |
| maximum operating current | 24.3 A |
| starting current | 24.3 A |
| refrigerant / filling quantity | R407C 5.0 Kg |
| total weight | 119 Kg |
| design pressure ( high / low ) | 3000 / 1300 KPa |
| waterproof grade | IP24 |
| fuse rated current | 30 A |

FIG.7

| type | YL-AC015 | type approval number | FE-9857 |
|---|---|---|---|
| main composition | $CO_2$ | range distance | 2.3 meters or more |
| reagent weight | 6.8kg | injection time | over 14 seconds |
| container weight | 14.5kg or less | container pressure250 | 250 kgf/cm$^2$ |
| total weight | 21.5kg $^{+1000g}_{-600g}$ | extinguishing value | B-6, C |

FIG.8 sampling module | verification of activity data and data quality | on-site verification list data import for digital verification | start digital verification sampling mode setting

| emissions (large) | emissions (medium) | emissions (small) | full range | total |
|---|---|---|---|---|
| 60% | 15% | 15% | 10% | 100% |

Memo: arrange emissions of activity data from large to small for each emission source

| category | verification information | | carbon emission verification | | | verification of data quality and uncertainty quantitation | |
|---|---|---|---|---|---|---|---|
| | Total amount of emission sources | Total number of items | need for verification | percentage | qty of samples | qty of samples | qty of samples |
| ︿ CAT 1-Direct GHG emission and removal | | | | | | | |
| CAT 1.1-Stationary fuel combustion source | 12 | 251 | YES | 100.0% | 251 | 2 items per emission source | 24 |
| CAT 1.2-Mobile fuel combustion source | 8 | 153 | YES | 100.0% | 153 | 2 items per emission source | 16 |
| CAT 1.3-Process emission | 10 | 200 | YES | 100.0% | 200 | 2 items per emission source | 20 |
| CAT 1.4-Fugitive emission | 12 | 160 | YES | 100.0% | 160 | 2 items per emission source | 24 |
| CAT 1.5-Land use, land-use change, and forestry | 0 | 0 | NO | NO | 0 | NO | 0 |
| ︿ CAT 2-Indirect GHG emissions from imported energy | | | | | | | |
| CAT 2.1-Purchased electricity | 1 | 12 | YES | 100.0% | 12 | 2 items per emission source | 2 |
| CAT 2.2-Purchased energy | 2 | 60 | YES | 100.0% | 60 | 2 items per emission source | 4 |

| | | | | | | | |
|---|---|---|---|---|---|---|---|
| ︿ CAT 3-indirect GHG emissions from transportation | | | | | | | |
| CAT 3.1-upstream transportation and distribution | 4 | 20,057 | YES | 1.0% | 201 | NO | 0 |
| CAT 3.2-downstream transportation and distribution | 4 | 8,049 | YES | 1.0% | 81 | NO | 0 |
| CAT 3.3-employee commuting | 1 | 28,800 | YES | 1.0% | 288 | NO | 0 |
| CAT 3.4-business travel | 0 | 0 | NO | NO | 0 | NO | 0 |
| CAT 3.5-visitor transport | 0 | 0 | NO | NO | 0 | NO | 0 |
| ︿ CAT 4-indirect GHG emissions from products used by organizations | | | | | | | |
| CAT 4.1-purchase of goods or services | 4 | 20,057 | YES | 1.0% | 201 | NO | 0 |
| CAT 4.2-activities related to fuels and energy | 45 | 836 | YES | 1.0% | 9 | NO | 0 |
| CAT 4.3-waste generated in operations | 12 | 12 | YES | 1.0% | 1 | NO | 0 |
| CAT 4.4-upstream purchased capital goods | 0 | 0 | NO | NO | 0 | NO | 0 |
| CAT 4.5-upstream leased assets | 0 | 0 | NO | NO | 0 | NO | 0 |
| ︿ CAT 5-indirect GHG emissions associated with the use of products from the organization | | | | | | | |
| CAT 5.1-use of sold products | 12 | 8,049 | YES | 1.0% | 81 | NO | 0 |
| CAT 5.2-processing of sold products | 0 | 0 | NO | NO | 0 | NO | 0 |
| CAT 5.3-end-of-life treatment of sold products | 12 | 8,049 | YES | 1.0% | 81 | NO | 0 |
| CAT 5.4-downstream leased assets | 0 | 0 | NO | NO | 0 | NO | 0 |
| CAT 5.5-franchises | 0 | 0 | NO | NO | 0 | NO | 0 |
| CAT 5.6-investments | 0 | 0 | NO | NO | 0 | NO | 0 |
| ︿ CAT 6-indirect GHG emissions from other sources | | | | | | | |
| CAT 6.1-others | 0 | 0 | NO | NO | 0 | NO | 0 |

11 sampling module | verification of activity data and data quality | on-site verification list performance of digital audit

| | | | |
|---|---|---|---|
| total of emission sources | 139 | | |
| amount of all inventory items | 94,745 | verificaion rate of activity data | 1.88% |
| total emissions | 54,136 | verificaion rate of emissions | 2.33% |

| | passed in digital audit | passed in manual audit | NG in digital audit | no digital audit | total of activity data |
|---|---|---|---|---|---|
| amount of inventory items | 1,709 | 80 | 80 | 92,876 | 94,745 |
| percentage (%) | 1.80% | 0.08% | 0.08% | 98.03% | 100% |

| CAT | digital verification | | | emission accounting | | |
|---|---|---|---|---|---|---|
| | state | review | qty of samples | verification of emissions | total emissions | unit |
| CAT 1-direct GHG emission and removal | | | | | | |
| CAT 1.1-stationary fuel combustion source | unfinished | 👁 | 251 | 155 | 155 | ton / $CO_2e$ |
| CAT 1.2-mobile fuel combustion source | unfinished | 👁 | 153 | 213 | 213 | ton / $CO_2e$ |
| CAT 1.3-process emission | finished | 👁 | 220 | 150 | 150 | ton / $CO_2e$ |
| CAT 1.4-fugitive emission | unfinished | 👁 | 184 | 188 | 188 | ton / $CO_2e$ |
| CAT 1.5-land use, land-use change, and forestry | no demand | | 0 | | | ton / $CO_2e$ |
| CAT 2-indirect GHG emissions from imported energy | | | | | | |
| CAT 2.1-purchased electricity | finished | 👁 | 14 | 233 | 233 | ton / $CO_2e$ |
| CAT 2.2-purchased energy | finished | 👁 | 64 | 122 | 122 | ton / $CO_2e$ |

| CAT 3-indirect GHG emissions from transportation | | | | | | |
|---|---|---|---|---|---|---|
| CAT 3.1-upstream transportation and distribution | finished | | 201 | 32 | 1,500 | ton / $CO_2e$ |
| CAT 3.2-downstream transportation and distribution | finished | | 81 | 43 | 1,750 | ton / $CO_2e$ |
| CAT 3.3-employee commuting | finished | | 288 | 56 | 56 | ton / $CO_2e$ |
| CAT 3.4-business travel | no demand | | 0 | | | |
| CAT 3.5-visitor transport | no demand | | 0 | | | |
| CAT 4-indirect GHG emissions from products used by organizations | | | | | | |
| CAT 4.1-purchase of goods or services | finished | | 201 | 15 | 1,900 | ton / $CO_2e$ |
| CAT 4.2-activities related to fuels and energy | finished | | 9 | 4 | 350 | ton / $CO_2e$ |
| CAT 4.3-waste generated in operations | finished | | 1 | 2 | 19 | ton / $CO_2e$ |
| CAT 4.4-upstream purchased capital goods | no demand | | 0 | | | ton / $CO_2e$ |
| CAT 4.5-upstream leased assets | no demand | | 0 | | | ton / $CO_2e$ |
| CAT 5-indirect GHG emissions associated with the use of products from the organization | | | | | | |
| CAT 5.1-use of sold products | finished | | 81 | 34 | 45,000 | ton / $CO_2e$ |
| CAT 5.2-processing of sold products | no demand | | 0 | | | |
| CAT 5.3-end-of-life treatment of sold products | finished | | 81 | 13 | 2,500 | ton / $CO_2e$ |
| CAT 5.4-downstream leased assets | no demand | | 0 | | | |
| CAT 5.5-franchises | no demand | | 0 | | | |
| CAT 5.6-investments | no demand | | 0 | | | |
| CAT 6-indirect GHG emissions from other sources | | | | | | |
| CAT 6.1-others | no demand | | 0 | | | |

FIG.17B

11 sampling module | verification of activity data and data quality | verification report CAT 1.1-stationary fuel combustion source-Data quality/C emissions/uncertainty quantification (verification)

| S.N. | name of emission source | activity data (date / interval) | amount of activity data | unit of activity data | data quality (Verification) | | carbon emissions (verification) | | uncertainty quantification (verification) | |
|---|---|---|---|---|---|---|---|---|---|---|
| | | | | | audit status | review | audit status | review | audit status | review |
| 1.1-000001 | emergency generator (PG-XXXX) x 1 | 2023/10/14 | 50 | L | pass in manual audit | | NG in digital audit | | passed in digital audit | |
| 1.1-000002 | emergency generator (PG-XXXX) x 1 | 2023/10/15 | 45 | L | no digital audit | | passed in digital audit | | passed in digital audit | |
| 1.1-000003 | emergency generator (PG-XXXX) x 1 | 2023/10/16 | 45 | L | pass in manual audit | | no digital audit | | no digital audit | |
| 1.1-000004 | emergency generator (PG-XXXX) x 1 | 2023/10/17 | 85 | L | no digital audit | | pass in manual audit | | passed in digital audit | |
| 1.1-000005 | emergency generator (PG-XXXX) x 1 | 2023/10/18 | 125 | L | no digital audit | | no digital audit | | no digital audit | |

| | | | | | | | | | | |
|---|---|---|---|---|---|---|---|---|---|---|
| 1.1-000006 | natural gas boiler (TF-XXXXX) x 1 | 2023/10/19 | 35 | m3 | no digital audit | | no digital audit | | no digital audit | |
| 1.1-000007 | natural gas boiler (TF-XXXXX) x 1 | 2023/10/20 | 25 | m3 | no digital audit | | passed in digital audit | | pass in manual audit | |
| 1.1-000008 | natural gas boiler (TF-XXXXX) x 1 | 2023/10/21 | 35 | m3 | no digital audit | | no digital audit | | no digital audit | |
| 1.1-000009 | natural gas boiler (TF-XXXXX) x 1 | 2023/10/22 | 25 | m3 | no digital audit | | pass in manual audit | | passed in digital audit | |
| 1.1-000010 | natural gas boiler (TF-XXXXX) x 1 | 2023/10/23 | 25 | m3 | no digital audit | | no digital audit | | no digital audit | |

10 each pages shows ‹ 1 2 3 4 5 6 7 8 9 10 ›

AI verification of carbon emission factor

| | |
|---|---|
| audit status | NG in digital audit |
| Desc.of factor (I) | GHG emission factor management table ed. 6.0.4 |
| Desc.of factor (II) | -- |
| Desc.of factor (III) | 2,019.0000000000 |
| Desc.of factor (IV) | Taiwan |
| Desc.of factor (V) | -- |
| GWP | AR4 |

Supporting doc(self-set factor)

| inventory | GHG | C emission factor | unit of C emission factor | to be verified data | | GWP | to be verified data |
|---|---|---|---|---|---|---|---|
| | $CO_2e$ | -- | -- | -- | -- | -- | -- |
| V | $CO_2$ | 2.6060317920 | Kg CO2 / L | 2.6060317920 | Kg CO2 / L | 1 | 1 |
| X | $N_2O$ | 0.0001055074 | Kg CH4 / L | 0.0001055074 | Kg CH4 / L | 28 | 25 |
| V | $CH_4$ | 0.0000211015 | Kg N2O / L | 0.0000211015 | Kg N2O / L | 298 | 298 |
| | HFCs | -- | -- | -- | -- | -- | -- |
| | PFCs | -- | -- | -- | -- | -- | -- |
| | $SF_6$ | -- | -- | -- | -- | -- | -- |
| | $NF_3$ | -- | -- | -- | -- | -- | -- |

description

11 sampling module | verification of activity data and data quality | on-site verifying list note: automatically check data quality and uncertainty memo: list items passed in manual audit but NG in digital audit, for on-site check

| on-site check (Pass/NG) | S.N. | name of emission source | production process or product/ raw material | activity data / carbon emission factor / GWP | | verification of data quality / uncertainty | |
|---|---|---|---|---|---|---|---|
| | | | | audit status | review | audit status | review |
| Pass | 1.1-000001 | emergency generator (PG-XXXX) x 1 | diesel oil | NG in digital audit | | passed in digital audit | |
| TBD | 1.1-000003 | emergency generator (PG-XXXX) x 1 | diesel oil | passed in manual audit | | passed in digital audit | |
| TBD | 1.2-000001 | official vehicle (Toyota XX.XX) | gasoline | passed in digital audit | | passed in manual audit | |
| TBD | ......... | .................. | ------ | passed in digital audit | | passed in manual audit | |
| TBD | ......... | .................. | ------ | passed in digital audit | | passed in manual audit | |
| TBD | ......... | .................. | ------ | passed in digital audit | | passed in manual audit | |
| TBD | ......... | .................. | ------ | passed in digital audit | | passed in manual audit | |
| TBD | ......... | .................. | ------ | passed in digital audit | | passed in manual audit | |
| TBD | ......... | .................. | ------ | passed in digital audit | | passed in manual audit | |
| TBD | ......... | .................. | ------ | passed in digital audit | | passed in manual audit | |

FIG.22

AUXILIARY VERIFICATION SYSTEM OF GREENHOUSE GAS INVENTORY

CROSS REFERENCE TO RELATED APPLICATION

This application is a continuation in part of U.S. patent application Ser. No. 18/501,043 which claims the benefit of the earlier filing date of 2023 Nov. 3. The entire specifications of which are incorporated herein by reference.

BACKGROUND

Field of the Invention

The present invention relates to a technology for verifying or auditing greenhouse gas (GHG) inventory, and more particularly to an auxiliary verification system of GHG inventory that is capable of reducing the labor demand for verification and enhancing verification efficiency by automatically verifying the GHG inventory, and even makes a sampling rate of 100% for the GHG inventory become possible.

Description of Related Art

With the global attentions to the topic of "NET ZERO CARBON REDUCTION", many countries have begun to ask the enterprises to compile their GHG inventory and develop carbon reduction strategies, and will also verify or inspect the results of the GHG inventory.

There are mainly two ways to compile the GHG inventory. One is to establish the GHG inventory on a digital platform, and the other is to make hard copy of the GHG inventory. Both ways will need to submit the GHG inventory, including activity data (i.e., raw data), inventory list and verification report to the approved auditing entity for verification, auditing or inspection.

The current audition/verification of GHG inventory is conducted in a completely manual manner in accordance with GHG verification guidelines issued by various countries or regions (e.g., but not limited to, GHG verification guidelines issued by the Environmental Protection Department of Taiwan, R.O.C.). The verifying process for the inventory report is shown in FIG. 1 and includes at least the following steps.

1. The verified unit end 1 provides a first version of verification report and inventory list and activity data to the verifying unit end 2.
2. The verifying unit end 2 conducts a document review of the first version of verification report, inventory list and activity data. If there are no issues or faults in the first version of verification report, inventory list and activity data, the verifying unit end 2 will directly go to the verified unit end 1 for on-site verification of inventory items. If preliminary problems are found or there is something needing to be clarified, the first version of verification report, inventory list and activity data will be returned to the verified unit end 1 for revision.
3. The verified unit end 1 provides a second version of verification report, inventory list and activity data to the verifying unit end 2.
4. The verifying unit end 2 conducts a document review of the second version of verification report, inventory list and activity data and directly goes to the verified unit end 1 for the first-time on-site verification of inventory items (S1). If there are no issues or faults in the second version of verification report, inventory list and activity data, it is confirmed that the inventory report is validated and qualified for issuance of verification certificate. If there is data that is incorrect or needs to be clarified, a verified finding report will be issued to the verified unit end 1 for response; and then, before a second-time on-site verification, a new version of verification report, inventory list and activity data will need to be provided to the verifying unit end 2.
5. The verified unit end 1 provides a third version of verification report, inventory list and activity data to the verifying unit end 2.
6. The verifying unit end 2 conducts a document review of the third version of verification report, inventory list and activity data and directly goes to the verified unit end 1 for a second time on-site verification of inventory items (S2). If there are no issues or faults in the third version of verification report, inventory list and activity data, it is confirmed that the inventory report is validated and qualified for issuance of verification certificate. If there is data that is incorrect or needs to be clarified, a verified finding report will be issued to the verified unit end 1 for response; and then, before on-site verification for a next time, a new version of verification report, inventory list and activity data will need to be provided to the verifying unit end 2.

The traditional verification method of GHG inventory may require different sessions of on-site verification (S1 to SN) depending on the complexity of the organizational boundaries or product composition, and each session of on-site verification may need a plurality of auditors to participate in the on-site verification. The verifying process is conducted by manually sampling 10% to 20% or a certain proportion (that meets the verification requirements) of inventory items, so it takes a lot of time to prepare and check the validation data for verification, resulting in very low verification efficiency.

However, the amount of data to be verified is very large, and it is necessary to review the modification of the inventory report or review the supplementary data or document, and even to conduct on-site verification. As a result, only a small number of data can be sampled for verification, verification efficiency is very low, and a great deal of labor and time is spent.

SUMMARY

One objective of the present invention is to provide an auxiliary verification system of GHG inventory, which can achieve automatic auditing of the GHG inventory, i.e., the verification report, inventory list, and activity data (i.e., raw data including inventory items) provided by the verified unit end, thereby significantly reducing the labor demand for verification and significantly enhancing verification efficiency.

Another objective of the present invention is to provide an auxiliary verification system of GHG inventory, which can allow for a sampling rate of up to 100% for adapting different demands for the accuracy of inventory results.

The further objective of the present invention is to provide an auxiliary verification system of GHG inventory, which allows a digital GHG inventory platform to link to for receiving the data to be verified, i.e., the verification report, inventory list and activity data and then checking if there is a fault therein.

To achieve the above objectives, or even more objectives, an auxiliary verification system of GHG inventory in accordance with an embodiment of the present invention allows a verified unit end to link to for receiving and verifying raw data of a GHG inventory provided by the verified unit end, the raw data includes an inventory item, the inventory item includes data fields, the data fields includes a first GHG emission value, and the auxiliary verification system includes: a verification database for pre-storing a plurality of pieces of validation data; a computing module connected to the verification database and configured to search for a global warming potential (GWP) and a GHG emission factor from the plurality of pieces of validation data based on a part of the data fields of the inventory item, in order to calculate a second GHG emission value; and a verification module connected to the computing module and configured to check whether the first GHG emission value of the inventory item meets the second GHG emission value.

Optionally, the data fields of the inventory item further includes a first GWP, a first GHG emission factor and at least one other data field, the at least one other data field is an activity data error level, an instrument calibration error level, an emission calculation parameter error level, a GHG uncertainty quantitative assessment, a category of emission factor, a source of emission factor or a name of emission factor; the GWP and the GHG emission factor searched out from the plurality of pieces of validation data are defined as a second GWP and a second GHG emission factor, respectively; the verification module checks whether the first GWP of the inventory item matches the second GWP, and checks whether the first GHG emission factor of the inventory item matches the second GHG emission factor; and the verification module searches for a piece of validation data corresponding to one other data field of the inventory item from the verification database, and checks whether this other data field matches the searched piece of validation data.

Optionally, the inventory item further includes a supporting document, the supporting document includes a plurality of pieces of supporting data, the plurality of data fields of the inventory item further includes a plurality of supporting fields corresponding to the plurality of pieces of supporting data; the auxiliary verification system further includes a character capturing module which is connected to the verification database and the verification module, the character capturing module obtains the supporting document of the inventory item and recognizes all characters in the supporting document, and then uses artificial intelligence (AI) technology to extract the plurality of pieces of supporting data from the recognized characters based on AI learning data in the verification database, and provide the extracted pieces of supporting data to the verification module; and the verification module checks whether the supporting fields match the extracted pieces of supporting data.

Optionally, the auxiliary verification system further includes: a conversion module connected to the verification database, the character capturing module, the computing module and the verification module, wherein the conversion module obtains the inventory item and uses the AI technology to perform language translation or synonym conversion on the inventory item based on the AI learning data in the verification database, and then, provides the results of the language translation or synonym conversion to the computing module and the verification module.

Optionally, the computing module utilizes the AI technology to change unit of data for the inventory item and the extracted characters based on the AI learning data in the verification database.

Optionally, the raw data comprises more inventory items, and the auxiliary verification system further comprises a sampling module configured to sample the inventory items based on a sampling rate or a sampling number, provide the computing module with the sampled inventory items for calculation of GHG emission value, and provide the verification module with the sampled inventory items for verification of the sampled inventory items.

Optionally, the auxiliary verification system also receives and verifies a verification report and an inventory list of the GHG inventory report provided by the verified unit end, and the verification report and the inventory list both contain a first total emission value and first emission subtotals that belongs to different GHG inventory categories; to verify the data from the verified unit end, the computing module calculates second emission subtotals that belongs to the GHG inventory categories, and calculates a second total emission value by summing up the second emission subtotals; and the verification module checks whether the first emission subtotal and the second emission subtotal generated by the computing module that belongs to the same GHG inventory category are consistent, and checks whether the first total emission value and the second total emission value from the computing module are consistent.

Optionally, the auxiliary verification system further includes: a compiling module connected to the verification module, for compiling verification results of the verification module into a verified verification report and a verified inventory list through AI technology, based on the verification report and the inventory list.

Optionally, the auxiliary verification system further includes: an interactive platform module connected to the verification module, being communicable with the verified unit end and configured to notify the verified unit end of a demand for correcting an incorrect inventory item when the incorrect inventory item exists in verification results of the verification module, and allow manual recheck to be performed by a verifier on an inventory item or provide the corrected inventory item to the verification module for automatic recheck when receiving the corrected inventory item.

Optionally, the inventory item further comprises a supporting document, the auxiliary verification system further comprises a character capturing module connected to the interactive platform module. The character capturing module obtains the supporting document of the inventory item and recognizes characters in the supporting document and then the interactive platform module transfers unrecognizable part of the supporting document from the character capturing module to the verified unit end, and then provides a character confirmation content to the character capturing module when receiving the character confirmation content from the verified unit end, and the character confirmation content is a result of confirmed characters for the unrecognizable part by the verified unit end.

Moreover, the present invention also provides an auxiliary verification system of GHG inventory in accordance with an embodiment, and the auxiliary verification system at least includes a verifying unit end and verified unit ends connected to the verifying unit end via network. The verifying unit end includes: a computing module of carbon emission of organization and product, a compiling module of verified finding report, a sampling module of activity data of major emission source, an optical character recognition (OCR) module, an interactive platform module of verification of sampled data, and a verification database, and they are communicable with one another. The computing module of carbon emission of organization and product calculates the carbon emissions of all direct or indirect emission sources of the verified unit ends. The compiling module of verified finding report records and reports the GHG emission of the verified unit ends. The sampling module of activity data of major emission source allows the setting of sampling quantity or sampling rate and the setting of allocation of samples in various categories, as well as the sampling allocation under various evaluation modes that cause differences in data quality. The OCR module is configured to perform optical character recognition on image data of document and receipt of the sampled inventory items or photos of nameplates of emission sources of the sampled inventory items to obtain relevant literal and numerical data and then compare the relevant literal and numerical data with the relevant validation data in the verification database for verification; and the OCR module also provides verification and verification results to the interactive platform module of verification of sampled data. The interactive platform module of verification of sampled data allows the verifying unit end to raise questions or provide supplementary suggestions when data is incorrect or needs to be clarified, and also allows the verified unit ends to provide replying explanations or replacement data. The verification database provides carbon factors of various countries or third-party manufacturers, as well as verification-related data, such as carbon footprint, labeled on equipment of various brands/models, for comparison performed by the OCR module.

Optionally, the computing module of carbon emission of organization and product calculates carbon emissions of direct or indirect emission sources of the verified unit ends based on calculation scope of an organizational boundary and an operational boundary.

Optionally, the compiling module of verified finding report includes verification objectives, methods, scope, data collection process, emission calculation methods, and emission results of the verified unit ends, as well as document voucher image data for each emission item listed in inventory.

Optionally, the sampling proportion is at least 15% or meets the verifying standards.

Optionally, the verification of activity data includes the verification of systematic operation data extracted from the OCR module from a document image from the verified unit ends, as well as the verification of paper-based data image data extracted from the OCR module.

In addition, an auxiliary verification system of GHG inventory in accordance with an embodiment of the present invention allows verified unit ends to link to for receiving an verification report, an inventory list and raw data provided by each of the verified unit ends, and the auxiliary verification system includes: a computing module of carbon emission of organization and product, a compiling module of verified finding report; a sampling module of activity data of major emission source; an OCR module; an interactive platform module, and a verification database, which are communicable with one another. The verification database provides carbon emission factors of various countries or third-party manufacturers, as well as data required for verification, and the required data comprises carbon footprint labeled on equipment of various brands or models. The sampling module of activity data of major emission source is configured to allow setting of sampling number or sampling rate, setting of sampling allocation in various emission categories, and setting of sampling allocation under various assessment modes that cause differences in data quality. And based on the setting of sampling number or sampling rate and the setting of sampling allocation the sampling module will sample multiple inventory items of the raw data. The computing module of carbon emission of organization and product calculates carbon emissions of direct or indirect emission sources of the verified unit end for each of the sampled inventory items. The OCR module is configured to perform optical character recognition on image data of voucher and photo of nameplate of emission source included in the sampled inventory item, so as to obtain relevant literal and numerical data, and compares the relevant literal and numerical data with relevant data fields of the sampled inventory item, thereby achieving verification of the activity data, and the OCR module is also configured to compare other data fields of the sampled inventory item with relevant validation data stored in the verification database, so as to achieve verification of the sampled inventory item. The compiling module of verified finding report is to verify the verification report and inventory list and the data from the OCR module. The interactive platform module allows an auditor to raise questions or supplementary suggestions therethrough when the verified data has a fault or needs to be clarified, and the interactive platform module of verification of sampled data also allows the verified unit end to provide replying explanations or supplementary in response to the questions or supplementary suggestions.

Optionally, the computing module of carbon emission of organization and product calculates the carbon emissions of direct or indirect emission sources of the verified unit end based on calculation scope of an organizational boundary and an operational boundary.

Optionally, the compiling module of verified finding report records an inventorying objective, method, scope, data collection process, emission calculation method, and results of emission calculation of the verified unit end, as well as image data of document and receipt for each emission item listed in inventory.

Optionally, the sampling rate is at least 15% or a rate that meets verification standards.

Optionally, the verification of activity data includes verification of image recognition of systematic operation data of the verified unit end, as well as verification of image recognition of hard copy.

Optionally, the auxiliary verification system further includes a compiling module connected to the verification module, for compiling the verification results of the raw data by the verification module into an on-site verification list, which can be used as the basis for on-site verification.

BRIEF DESCRIPTION OF THE DRAWINGS

After studying the detailed description in conjunction with the following drawings, other aspects and advantages of the present invention will be discovered:

FIG. 5 is a table of an example of data sources of GHG inventory in the present invention;

FIGS. 6A and 6B are schematic tables of an example of an inventory list of the present invention;

FIG. 7 and FIG. 8 are schematic diagrams of nameplate photos of large equipment in the present invention;

FIGS. 15 to 21A and FIG. 22 are schematic diagrams of user interfaces provided to the auditor by an auxiliary verification system according to an embodiment of the invention.

DETAILED DESCRIPTION

Figure 1:
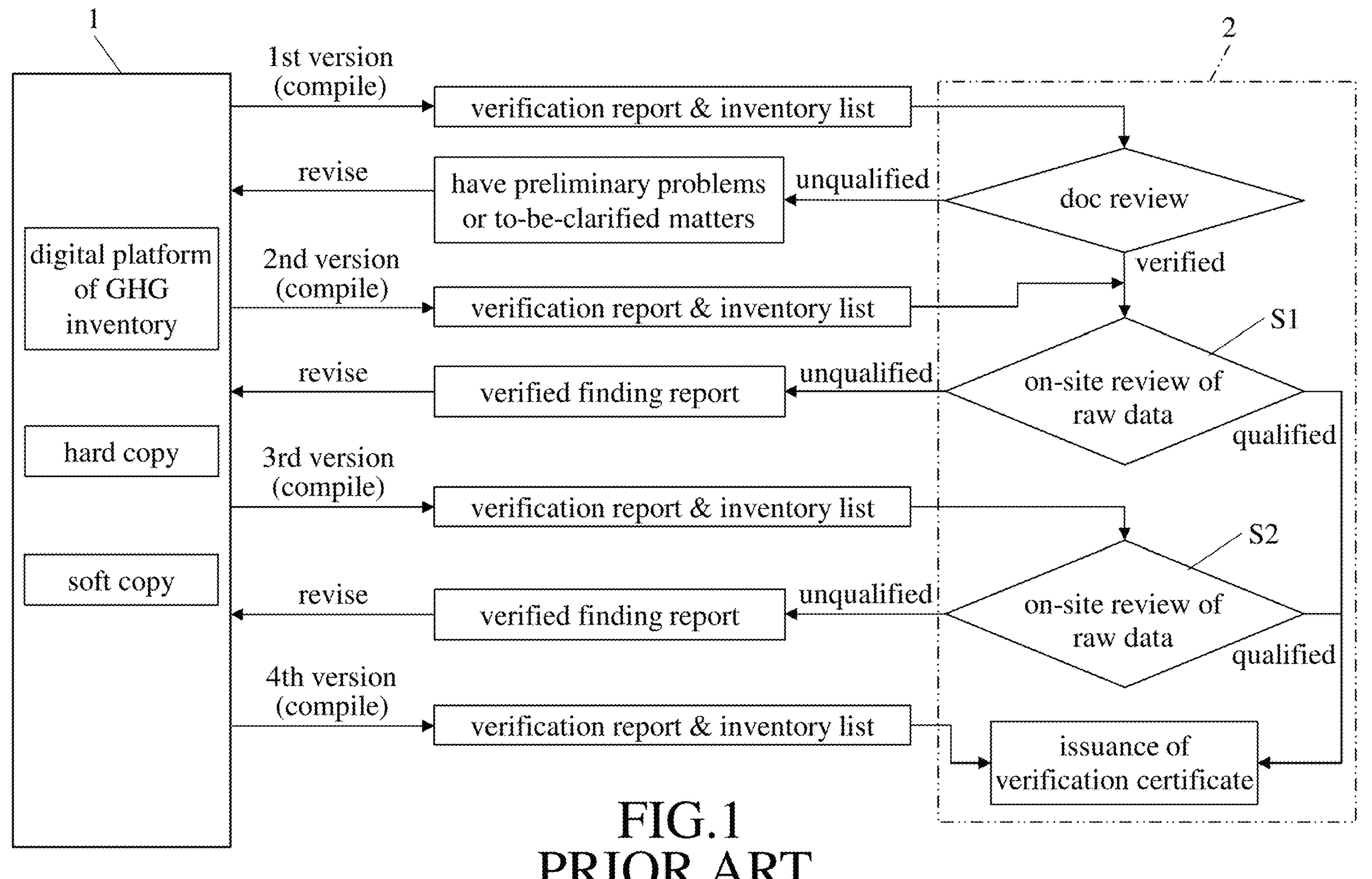
FIG. 1 is a rough flow chart of the current verification process of GHG inventorying.
Figure 2:
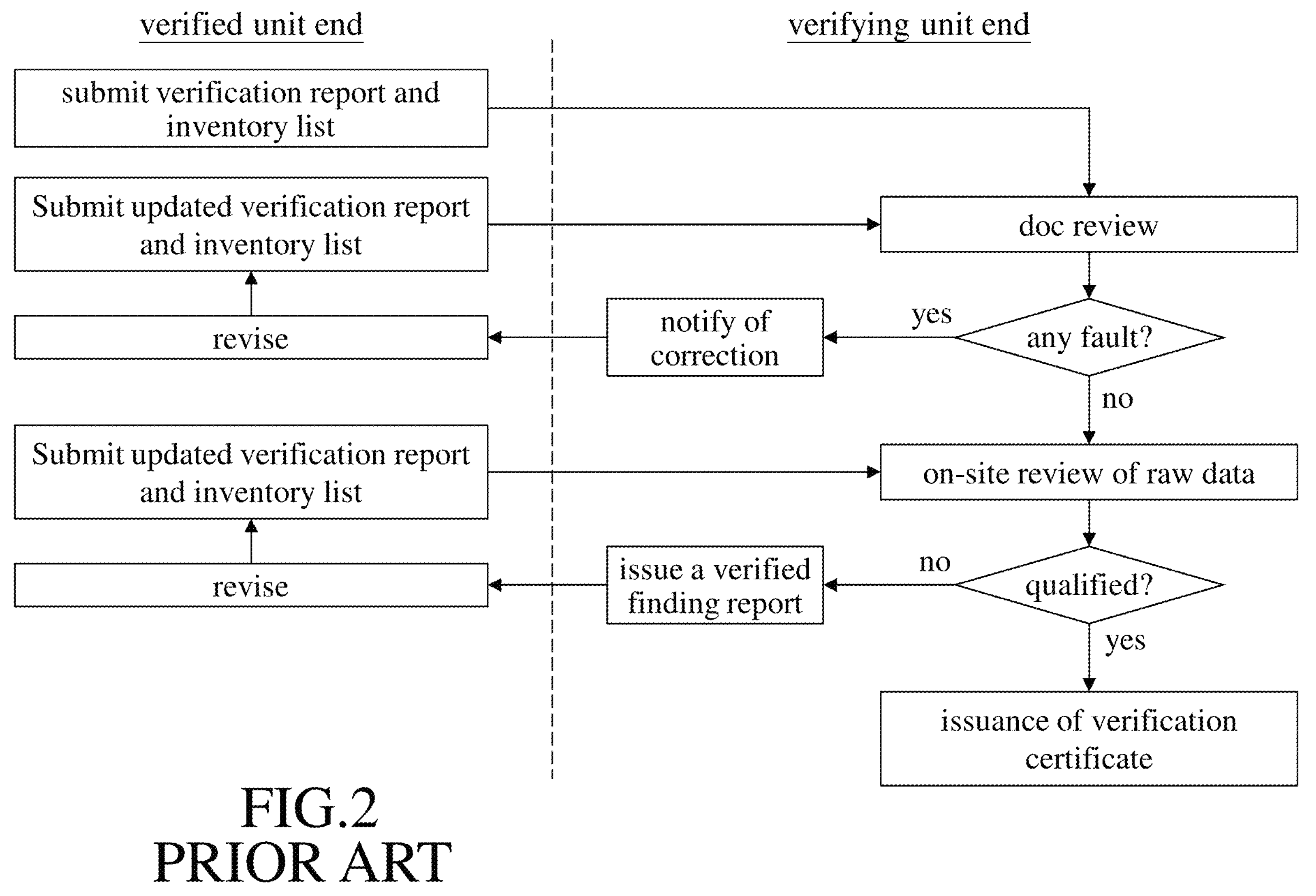
FIG. 2 is a specific flow chart of the current verification process of GHG inventorying.
Figure 3:
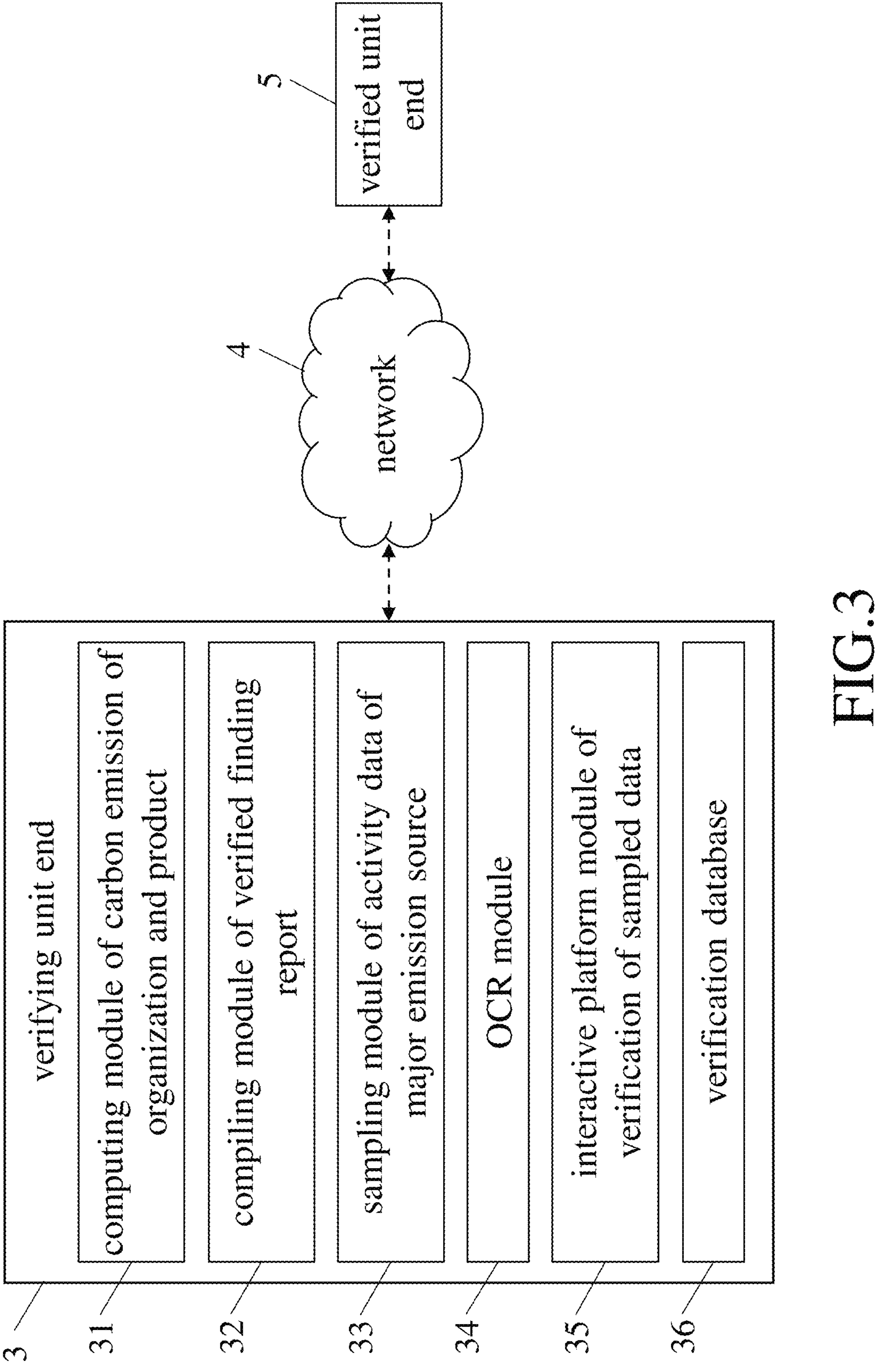
FIG. 3 is a system architecture diagram of an auxiliary verification system of GHG inventory according to an embodiment of the invention.

Referring to FIGS. 3 to 10, an auxiliary verification system of GHG inventory of the present invention (i.e., a verifying unit end 3) can allow verified unit ends 5 (e.g., but not limited to, a digital GHG inventory compiling platform) to connecting thereto (or link thereto) via a communication network 4, to receive and verify to-be-verified information, i.e., an verification report, an inventory list and related raw data, provided by the verified unit end.

The raw data collects the details and related data of each inventory item of GHG emission from the verified unit end (such as an enterprise). The raw data includes at least one inventory item, one inventory item contains data fields including a GHG emission value, a GHG emission factor, other data fields associated with the GHG emission factor (such as, but not limited to, a GWP, a GWP category, a GHG category, an activity data error level, an instrument calibration error level, an emission calculation parameter error level, a GHG uncertainty quantitative assessment, a category of emission factor, a source of emission factor and a name of emission factor, etc.) and data fields related to the GHG emission value (such as, but not limited to, time of activity data, unit of activity data, value of activity data, etc.). Each GHG emission item (or called inventory item) listed in the inventory has a different supporting document presented with image data of document or receipt, such as the image data of purchase orders, electricity bills, fuel invoices, commuting distances, or other related information voucher. For larger equipment (such as cooling tower, air conditioners, water dispensers, dehumidifiers, etc.), photos of nameplates of equipment and emission sources can be used as the image data of document or receipt (as shown in FIGS. 7 and 8).

The inventory list is a list that records the statistics regarding GHG emission sources and related emissions of the verified unit end within the inventory scope. It classifies the emissions of the verified unit end, including emission source projects of different categories (such as energy use, transportation, manufacturing processes, etc.). The inventory list as shown in FIGS. 6A and 6B, provides a detailed description of the emissions of different activities and processes of the verified unit end. For example, the emission value of input electricity is 417.5225, occupying 100%, the emission value of input energy is 0, occupying 0.00%; and the total emission value is 417.5225 ($tCO_2e$). The inventory list helps organizations better understand emission sources, recognize potential emission reduction opportunities, and develop and implement subsequent emission reduction strategies. In other words, the inventory list records the statistical results of GHG emission value for each GHG inventory category in the raw data.

A verification report (i.e., investigation report of GHG inventory) is an overview file configured to evaluate and record the GHG inventory of the verified unit end, which is usually written by professional inventory agencies or internal inventory teams. This report covers key contents such as the inventory objectives, methods, scope, data collection process, emission calculation methods, and emission results of the verified unit end. The verification report can be divided into direct GHG emissions and indirect GHG emissions as shown in FIG. 5. Simply put, the verification report records the statistical results of various data in the inventory list and evaluates and summarizes according to different statistical results.

The direct GHG emission value include fuel combustion of stationary equipment, such as the fixed combustion sources of the boilers, furnaces, combustion furnaces, etc.; Mobile combustion sources are referring to vehicles or transportation of raw materials, products, waste, and employee commuting; The emission sources of acetylene and CO2 used in cutting from the physical or chemical process emissions of catalytic cracking in the refining process; Intentional and unintentional emissions, such as fugitive emission sources the leakage of fillers or refrigerant from equipment joints, seals; The change from forest land to agricultural land or from cultivated land to non-cultivated land may result in emission sources from land use changes where carbon stock changes.

The indirect GHG emission value, include the production from input energy, such as electricity consumption, steam, thermal energy, cooling, compressed air, etc.; the emission from the transportation, such as the upstream transportation of goods, downstream transportation of goods, employee commuting, etc.; emission from the factories and equipment for manufacturing the products used by an organization; emission from the investment, equity debt, investment debt, etc. derived from the products used by an organization.

The verifying process of the invention is to verify (or check and verify) the correctness of the items listed in the two documents of the verification report and inventory list, and to check the correctness of the data fields of each inventory item in the raw data.

The following is an exemplary illustration of an auxiliary verification system provided by an embodiment of the invention.

The verifying unit end 3 includes at least one computing module of carbon emission of organization and product 31, a compiling module of verified finding report 32, a sampling module of activity data of major emission source 33, an OCR module 34, an interactive platform module of verification of sampled data 35, and a verification database 36, which are communicated with one another.

Figure 4:
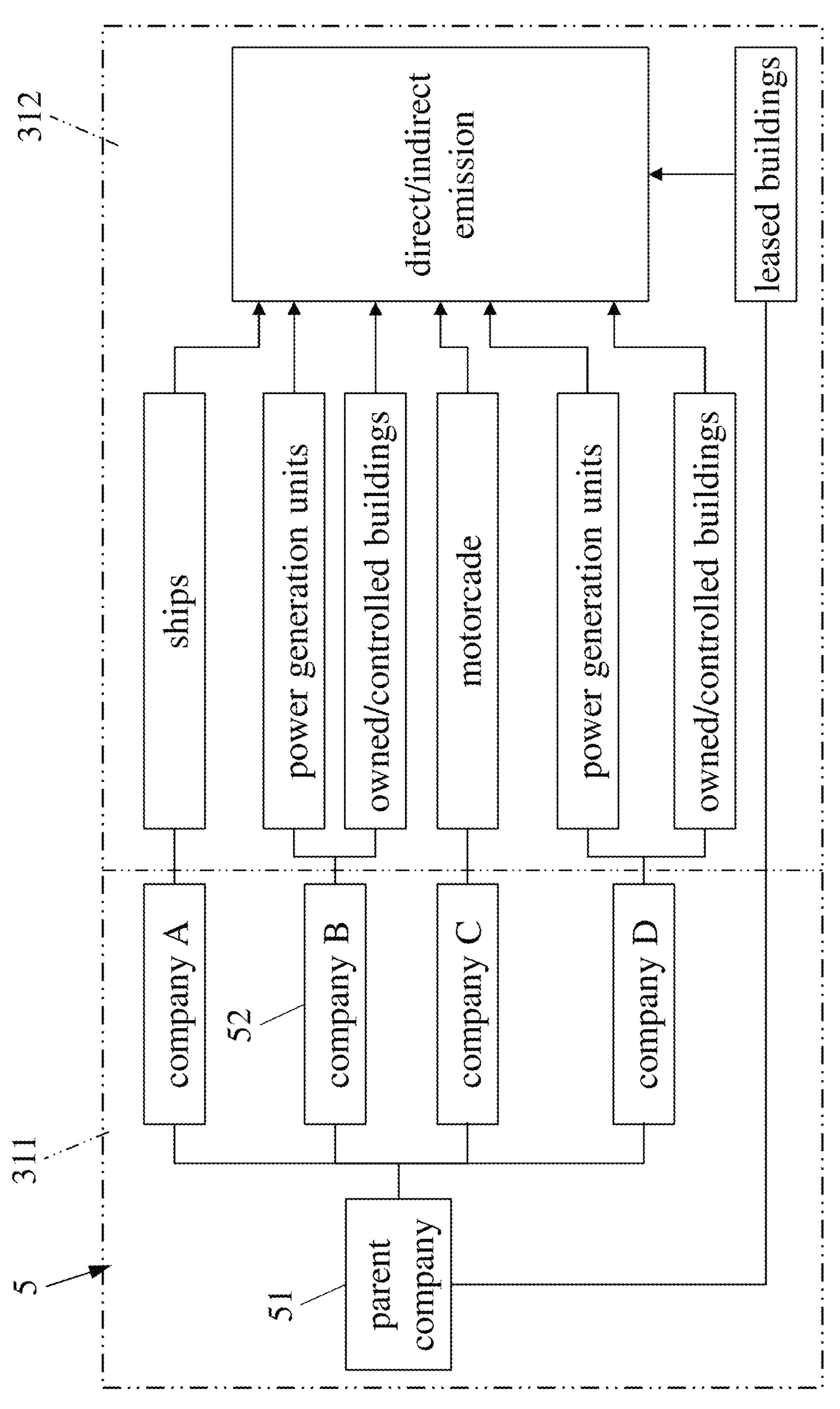
FIG. 4 is a schematic diagram of calculation of carbon emissions of direct/indirect emission sources used in an auxiliary verification system according to an embodiment of the invention.
Figure 9:
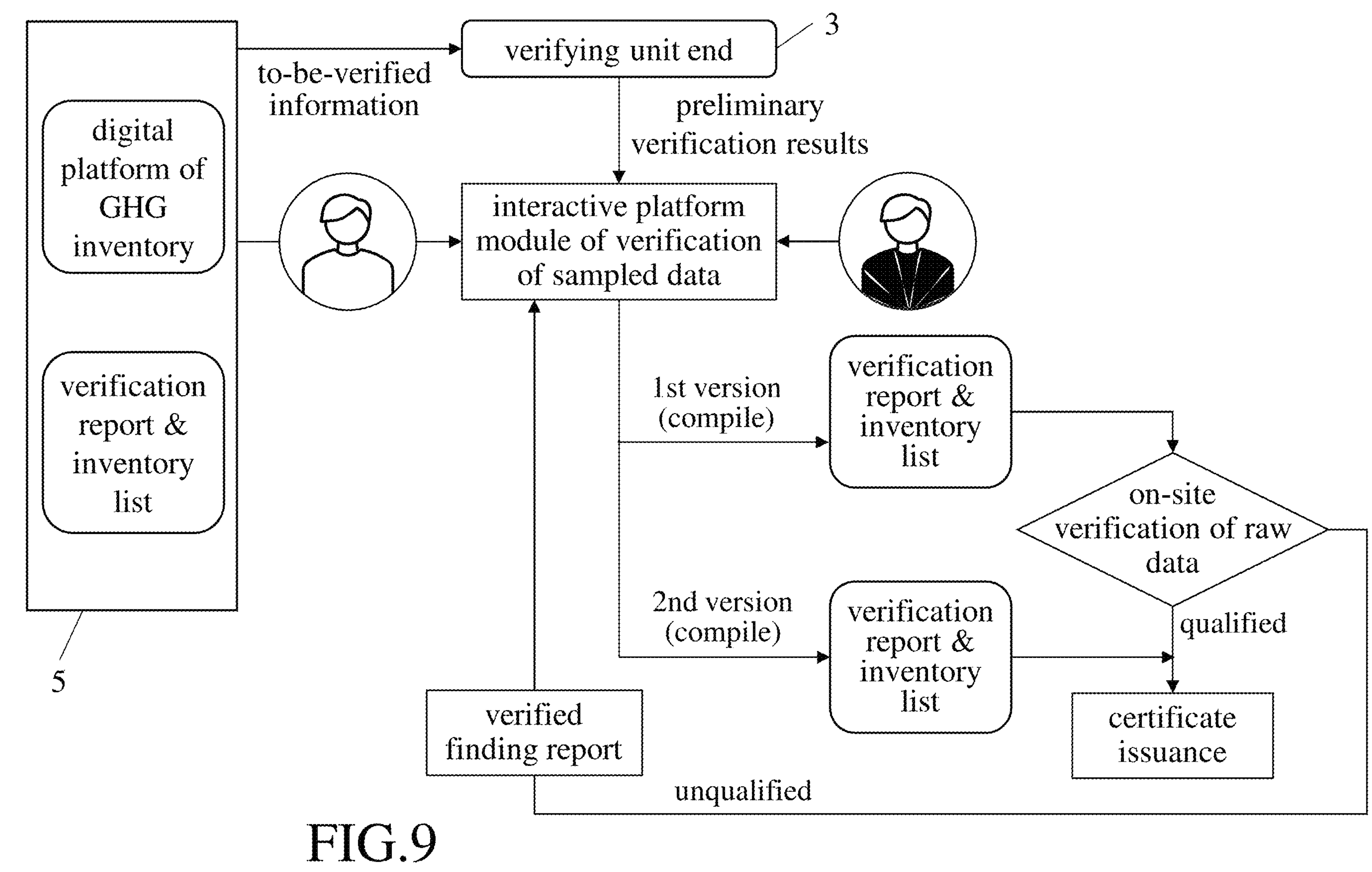
FIG. 9 and FIG. 10 are flow charts of verification in the invention.
Figure 10:
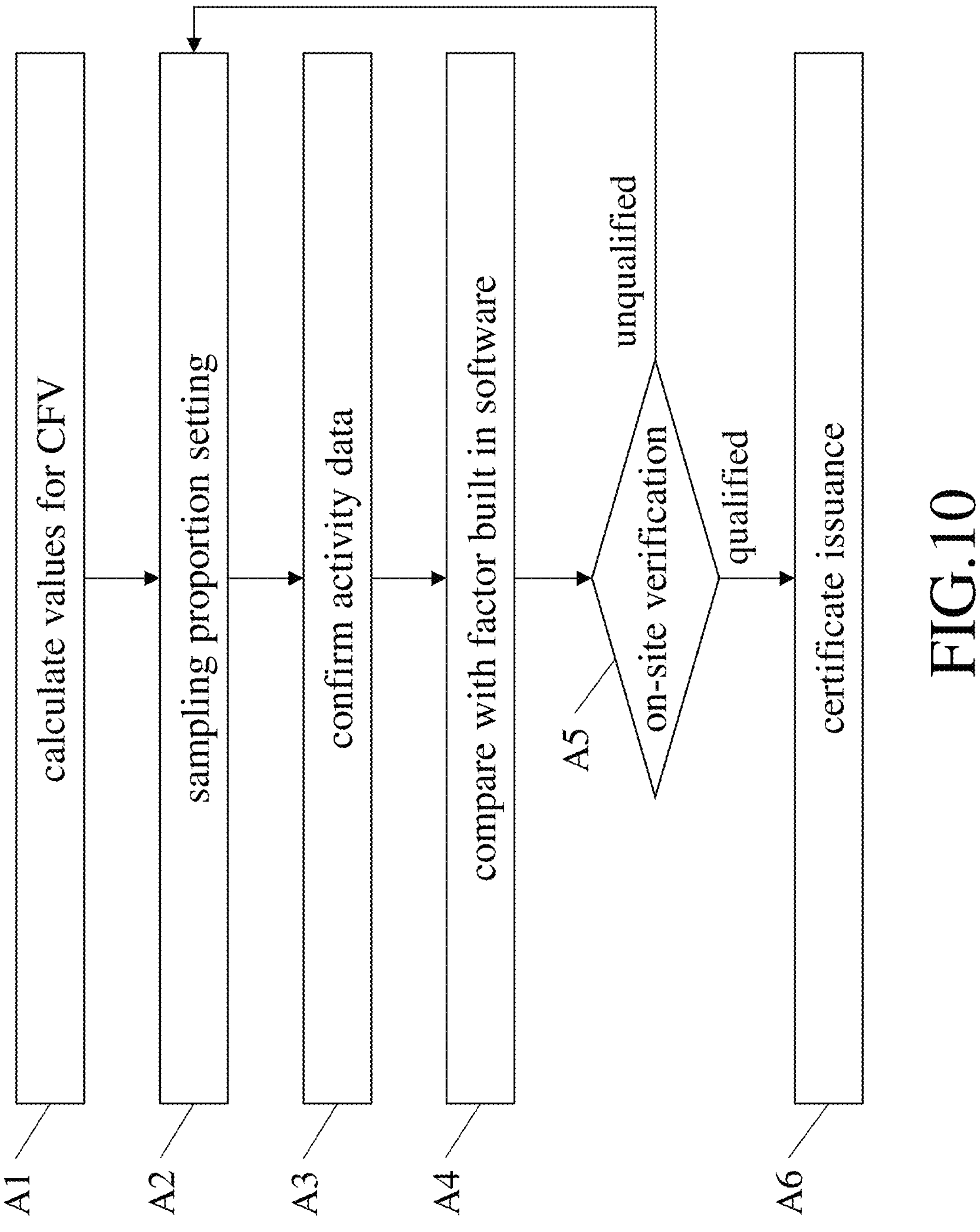
Figure 11:
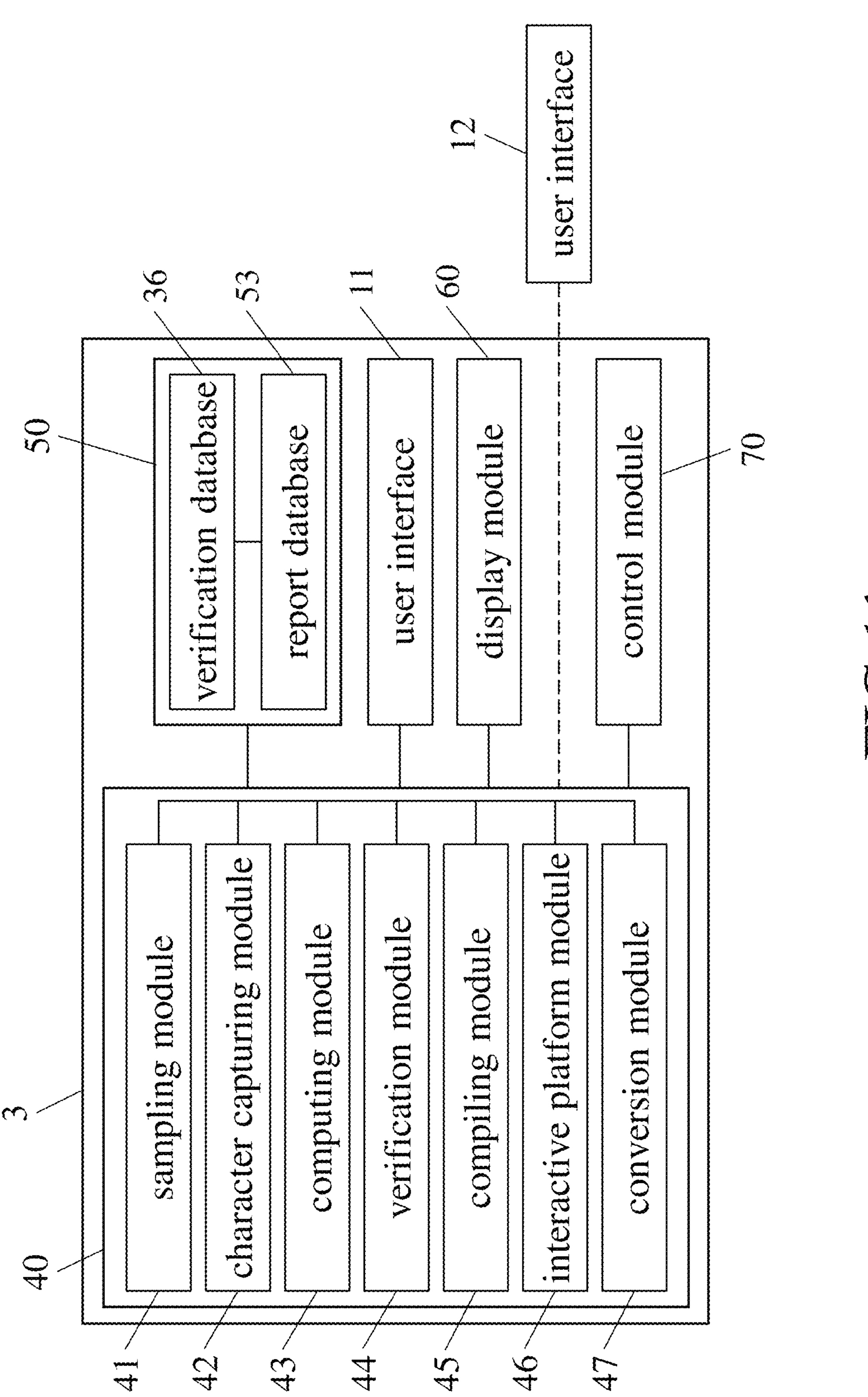
FIG. 11 is a functional block diagram of an auxiliary verification system of GHG inventory according to an embodiment of the invention.
Figure 12:
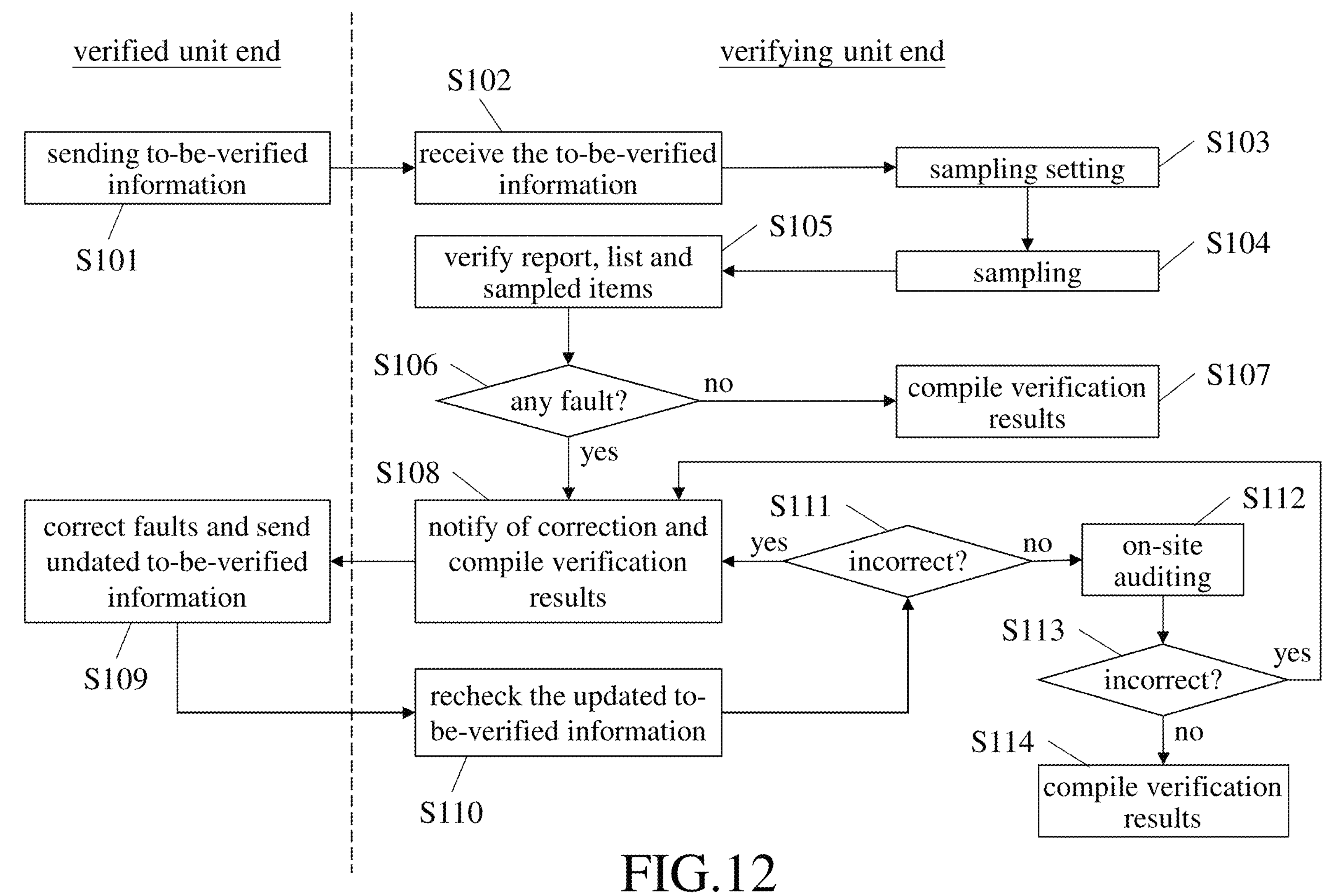
FIG. 12 is a flow chart of a verification method for raw data according to an embodiment of the invention.
Figure 13:
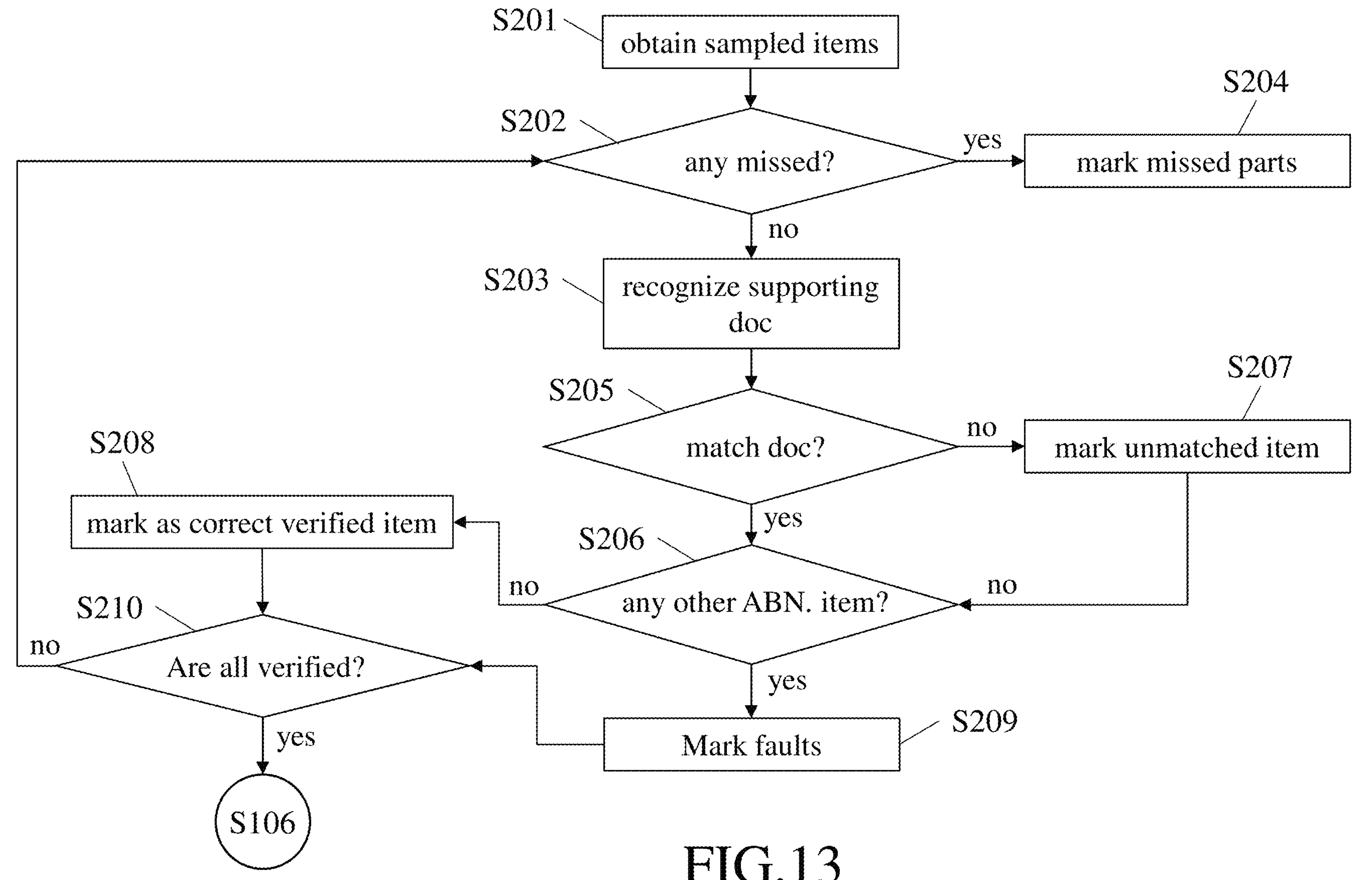
FIG. 13 is a flow chart of a verification method for sampled inventory items according to an embodiment of the invention.
Figure 14:
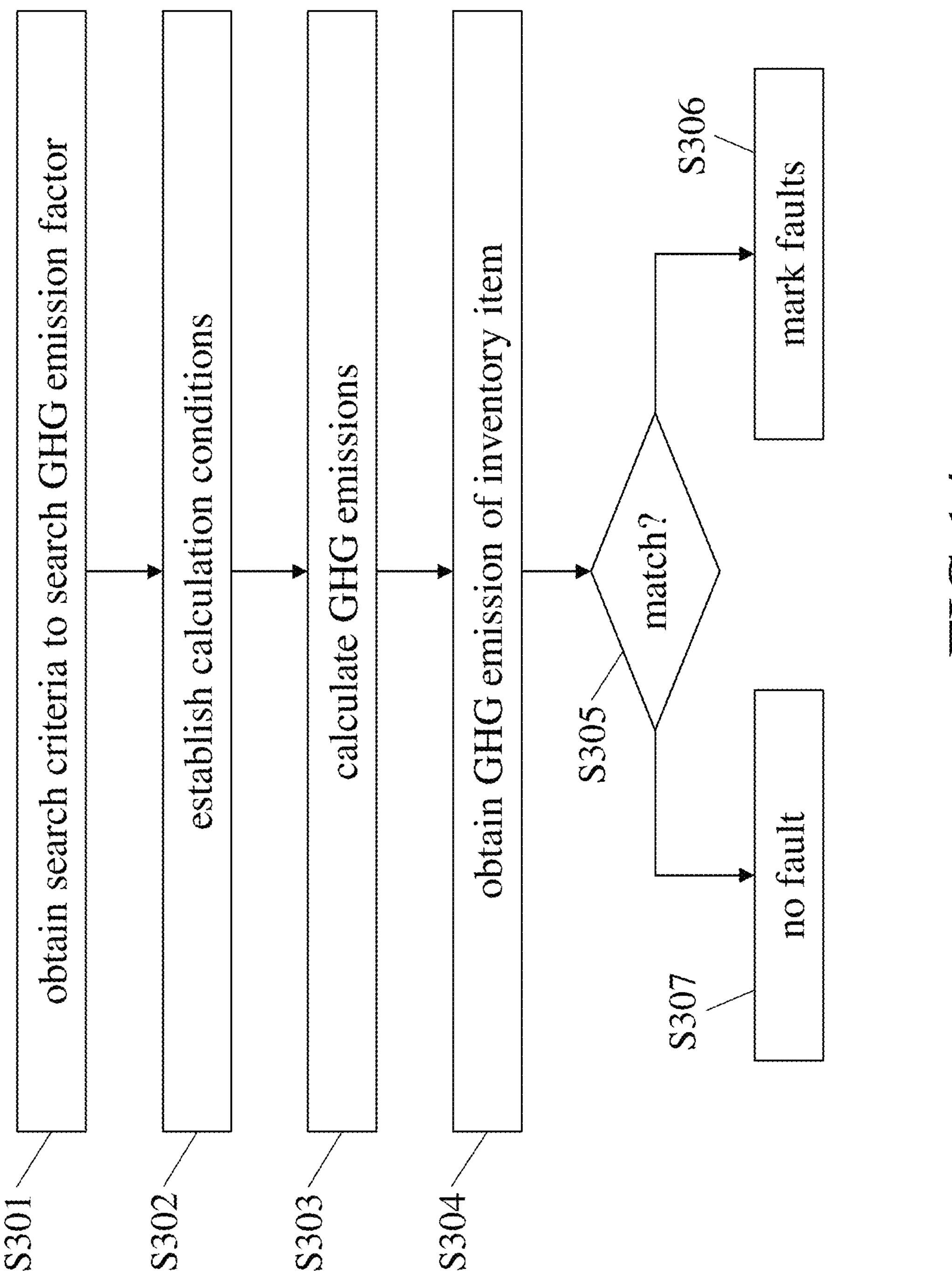
FIG. 14 is a flow chart of a verification method for GHG emissions as data fields according to an embodiment of the invention.

The computing module of carbon emission of organization and product 31 calculates the carbon emissions of all direct/indirect emission sources of the verified unit ends 5 mainly based on the calculation scope of an organizational boundary 311 and an operational boundary 312. The calculation method can be roughly presented by the carbon emission calculation chart for direct/indirect emission sources as shown in FIG. 4, wherein the subsidiaries 52

(Company A to Company D) under the parent company 51 of the verified unit ends 5 belong to the calculation category of the organizational boundary 311; The ships, power generation units, owned/controlled buildings, fleets of vehicles, and leased factories of the subsidiaries 52 belong to the calculation scope of the operational boundary 312. Product carbon emission verification is based on the ISO 14067 carbon footprint specification to calculate the direct/indirect carbon emissions generated by a product throughout its entire life cycle. The monitoring calculation method is roughly as follows:

1. Direct monitoring method: Directly monitoring exhaust concentration and flow rate to measure GHG emissions.
2. Mass balance method: The balance calculation of material mass and energy input, output, consumption, and conversion in the manufacturing process.
3. Emission factor method: Emissions=appropriate activity intensity data×Emission factor×GWP.

The emission factor method is mainly configured to calculate various carbon emissions. This module uses AI to verify the correctness of validation data, whether the factors used are reasonable, and to enhance the accuracy of AI judgment by collecting feedback from the manual review process.

The compiling module of verified finding report 32 is configured to record and report the GHG emission of the verified unit end based on the verification results of the OCR module 34.

The sampling module of activity data of major emission source 33 is able to determine the sampling quantity (proportion) and allocation of samples in various categories, as well as the sampling allocation under various evaluation modes that cause differences in data quality. It must have the ability to adjust flexibly, facilitate setting, and self-learning.

The OCR module 34 is configured to perform optical character recognition on the document voucher image data attached to each item listed in the verification process (such as purchase orders/electricity bills/distance/ . . . and other related information), as well as the nameplate photos on the emission source, carry out optical character recognition to obtain relevant literal and numerical data, and compare the relevant verifying data provided by the verification database 36, and have the ability to provide the collaborative platform for the recognition of blurred, stained and other affected conditions caused by long-term placement, and then recognize again after discussion and strengthen AI learning.

The interactive platform module of verification of sampled data 35 is a collaborative platform for the above modules, which allows the verifying unit end to raise questions or supplementary suggestions on problematic inventory items, and can also allow the verified unit ends 5 to provide reply explanations or replacement data, which simplifies the process of document exchange between both parties and reduce the on-site verifying work of verifying unit end.

The verification database 36 provides the necessary data for relevant verifying work, such as:

1. Carbon factor databases provided by various countries or third-party manufacturers: different countries provide different definitions of carbon factors. For items beyond the defined range, professional third-party advice can be provided to suggest the right carbon factors to be used, or use self-defining carbon factors as long as the factor cited can be explained and accepted by the verifying body.
2. Basic information database for each brand of equipment: it provides basic information labeled by each brand/model of equipment, such as electricity consumption, product carbon footprint, and other information.

Through the aforementioned combination, the verified unit ends 5 provide the verification report and inventory list, as well as the document voucher image data attached to each item listed in the verification process, and other to-be-verified information. The verifying unit end 3 conducts a verification of the OCR data, cited carbon factor data, and other necessary data using a sampling proportion on the verification report, the inventory list, and the document voucher image data. If all data passes the verification, the verification certification can be issued; If the data is incorrect or needs to be clarified, the verification finding report will be provided to the supplier as response, and before the next stage of on-site verification, a new verification report and inventory list will be produced and provided to the verifying unit end 3. This can save a lot of manpower and time, simplify the work process, accelerate on-site verification time, and carry out 100% activity data and carbon factor verifying work.

The following is an exemplary description of a verifying method adopted by the auxiliary verification system in accordance with one embodiment of the invention. The verifying method includes at least the following steps:

1. The calculation of carbon verification value AI refers to the AI calculation of the carbon verification value of the verified unit ends 5 or products. The verified unit ends 5 submits the verification report and inventory list to the verifying unit end 3, and the verifying ratio can be set by the verified unit ends 5, provided that the ratio is at least 15% or meets the verifying standards. The verifying unit end 3 verifies the correctness of the verification report and inventory list. This step is carried out by the computing module of carbon emission of organization and product 31 and the compiling module of verified finding report 32, and the preliminary verification results are sent to the interactive platform module of verification of sampled data 35.
2. A sampling proportion operation A2: the sampling module of activity data of major emission source 33 conducts the sampling proportion operation based on the major emission source and activity data, and sends the data to the interactive platform module of verification of sampled data 35.
3. Confirm activity data A3, which is confirmed by the OCR module 34 and includes:

a. Company's systematic operation data character recognition verification. After sampling, the verified unit ends 5 are requested to provide a systematic screenshot to the interactive platform module of verification of sampled data 35 to verify the optical character recognition of the document voucher image data. If the data is untrustworthy, the data should be marked and then discussed on the collaborative platform.

b. Verification of the optical character recognition of image data and paper-based data, verify the optical character recognition of the document voucher image data. If the data is untrustworthy, the data should be marked and then discussed on the collaborative platform.

4. A comparison of software built-in carbon verification factor A4 is the comparison of software built-in verification database 36 and the data after optical character recognition verification, including:

a. The verified unit ends 5 use carbon factor: there is a built-in verification database 36 to compare the differences in numerical values. If the data is untrustworthy, the data should be marked and then discussed on the collaborative platform.
b. The verified unit ends 5 use carbon factor: there is no built-in verification database 36, and numerical differences cannot be compared, the verified unit ends 5 provide screenshots and standards of the cited carbon factor, and then discuss on the collaborative platform.

5. On-site verification A5: after the operation of the collaborative platform, in view of the untrustworthy of the above marked activity data or the verification database 36, a list file is drawn up, which can be used for on-site verification when verifying boundaries and emission sources.
6. Issue of verification certification A6, if the data is verified to be correct, a verification certification can be issued. If the data is incorrect or needs to be clarified, log in to the interactive platform module of verification of sampled data 35 and give the report on verifying findings to the verified unit ends 5 for response, and before the next stage of on-site verification, a new verification report and inventory list will be produced and provided to the verifying unit end 3.

The invention utilizes the aforementioned optical character recognition for verification, which saves personnel operation and the process of commuting to and from the verified unit ends 5, thereby saving a lot of manpower and time, simplifying the work process, accelerating on-site verification time, and carrying out 100% activity data and carbon factor verifying work. Furthermore, the invention improves the disadvantages of the conventional verification operations which require a significant amount of time to prepare and confirm the data to be verified.

It can be seen from the above that the present invention uses the verified unit ends 5 to provide the verification report and inventory list, as well as the document voucher image data attached to each item listed in the verification process, and other to-be-verified information. The verifying unit end conducts a verification of the optical character recognition (OCR) data, cited carbon factor data, and other necessary data using a sampling proportion on the verification report, the inventory list, and the document voucher image data, directly conducting verification operation against the verified unit ends that use digital platform to collect data. This can save a lot of manpower and time, simplify the work process, accelerate on-site verification time, and carry out 100% activity data and carbon factor verifying work.

The following is an exemplary description of the details of the auxiliary verification system.

Referring to FIGS. 11 to 22, the auxiliary verification system according to an embodiment of the present invention may be implemented at least in part in a verifying server (i.e., the verifying unit end 3) of the verifying unit end. The verifying server may be made available to the verifying unit end for use as a verification tool, allowing at least one digital platform of GHG inventory (i.e., part of the verified unit end) adopted by the verified unit end to be connected through the network, and allowing the verified unit end's computer devices (i.e., part of the verified unit end) to be connected through the network.

The verifying unit end refers to a verification institution that can provide GHG verification services, such as but not limited to the Industrial Technology Research Institute, the British Standards Institution (BSI), Swiss General Surveyor (SGS), German Technical Inspection Association (TUV), etc. The verified unit end is, for example, but not limited to the company. The verified unit end's computer devices include but not limited to desktop computers, laptops, smartphones, tablets, cloud computer, etc. Therefore, the verifying unit end may use this verification tool to automatically verify whether there are errors or omissions in the GHG carbon footprint verification provided by the verified unit end.

The verifying unit end 3 includes at least a user interface 11, a user interface 12, a processor 40, a storage 50, a display module 60, and a control module 70. The processor 40 is electrically connected to the storage 50, the display module 60 and the control module 70, is communicated with the user interface 11, and can be connected to the user interface 12 through the network.

The user interface 11 can be displayed to the verifying unit end through the display module 60, and the control module 70 allows the verifying unit end to input data and to set and control the operation of the verifying server. The user interface 11 can be provided by an application installed on the verifying server.

The user interface 12 can be displayed to the verified unit end for viewing through the display module of the verified unit end's computer device and operated by the verified unit end through the control module of the verified unit end's computer device. The user interface 12 can be a web page that links to the verifying server or may be provided by an application installed on the verified unit end's computer device.

The storage 50 includes the aforementioned verification database 36 and a report database 53 connected to the verification database 36 via information.

The verification database 36 can store a plurality of pieces of validation data and AI learning data. These validation data include, but are not limited to, the basic information about each brand of equipment (such as but not limited to basic information labeled on each brand/model of equipment, such as electricity consumption, product carbon footprint, etc.), a plurality of GHG emission factors, GWP value related to each GHG emission factor, GWP category, activity data error level, instrument calibration error level, emission calculation parameter error level, GHG uncertainty quantitative assessment, factor category, factor source and factor name, etc. The GHG emission factors and their associated validation data are obtained from GHG emission factor management tables provided by various countries, regions or companies (e.g., but not limited to the GHG emission factor management tables of Taiwan), and are organized in a data structure that is indexed based on the predefined associations and field names of the plurality of data fields. The AI learning data include, for example, but are not limited to, data for language translation, synonym conversion, and data unit conversion. The verification database 36 was built using AI technology.

The verification database 36 may be implemented, for example, but not necessarily by a plurality of associated lookup tables. For example, these lookup tables can be categorized by, for example, but not limited to, GWP categories. The lookup tables belonging to the same GWP category record a GWP value, a plurality of GHG emission factors associated with this GWP value, GWP categories associated with the GHG emission factors, activity data error level, instrument calibration error level, emission calculation parameter error level, GHG uncertainty quantitative assessment, factor categories, factor source and factor name, etc.

The report database 53 can store to-be-verified information received by the auxiliary verification system, and verification results generated by the auxiliary verification system, etc. The to-be-verified information includes the GHG verification report, the inventory list and raw data of the inventory results. Both the verification report and inventory list contain a to-be-overqualified emission value (i.e. the first total emission value) and a plurality of to-be-verified emission subtotals (i.e. first emission subtotals) belonging to different GHG inventory categories. The raw data includes at least one inventory item. A single inventory item includes, for example, but is not limited to, a plurality of data fields and one supporting document.

The processor 40 includes a sampling module 41 (including a part of the sampling module of activity data of major emission source 33), a character capturing module 42 (including a part of the OCR module 34), a computing module 43 (namely, the computing module of carbon emission of organization and product 31), a verification module 44 (including a part of the OCR module 34), a compiling module 45 (i.e., the compiling module of verified finding report 32), an interactive platform module 46 (i.e., the interactive platform module of verification of sampled data 35), and a conversion module 47 (including a part of the OCR module 34).

The sampling module 41 can be connected to the storage 50 via communication and can provide pages through the user interface 11 to users (such as verifying unit ends or verified unit ends) to set a sampling rate or a sampling number for each category or inventory category under various evaluation modes that cause differences in data quality. In addition, the sampling module 41 can also obtain the to-be-verified information from the report database 53, and then randomly sample the verification of a set of inventory items from the to-be-verified information based on the sampling setting results. By means of sampling module 41, the auxiliary verification system of the invention has the ability of flexible adjustment with high convenience to meet the different requirements for the accuracy of the inventory results.

The character capturing module 42 can be connected to the storage 50 via communication and can use OCR technology to recognize the characters (e.g. text and numbers) presented in the images (e.g. but not limited to photos of documents and vouchers (e.g. images of purchase orders, electricity bills, etc.) in the supporting documents of the inventory items, or read the text and numbers in articles or forms directly from the supporting documents.

In addition, the character capturing module 42 can also use AI techniques (such as but not limited to Large Language Model (LLM)) to select the specified text and the corresponding number of the selected text from all the recognized characters according to the AI learning data of the verification database 36, such as, but not limited to, “refrigerant” and “R407” corresponding to “refrigerant”, and “filling amount, and ““50” and “Kg” corresponding to “filling amount”.

Moreover, the character capturing module 42 can also provide unrecognizable parts of the image, such as, but not limited to, parts with blurred characters (as indicated by the dotted box in FIG. 8), parts covered by stains, parts including missing characters, etc., to the interactive platform module 46 for the verifying unit end and the verified unit end to discuss on the unrecognizable parts. Then the recognition results are corrected according to the discussion results. In addition, a character confirmation unit 423 can also record the correlation between these unrecognizable parts and the corrected results in the verification database 36 to enhance AI learning.

The computing module 43 can be connected to the storage 50 via communication and can use AI technology to establish the Search criteria configured to search out the operation parameters and the calculation conditions configured to calculate the operation parameters based on a part of the many data fields of the inventory items and the AI learning data of the verification database 36. Search criteria include, but not limited to, the data fields of “GWP Category”, “GHG category”, “emission source form”, “product or raw material name”, “industry category”, “Process of Manufacturing for Industry”, “product or raw material classification”, “region” and “year” are configured to create the search criteria. The calculation conditions are, for example, but not limited to, the use of data fields related to emission activities, such as “activity data amount”, “activity data units”, etc., to calculate activity intensity data. For example, the amount of activity data is the amount of gasoline, the activity data unit is the unit of gasoline, and the multiplication of these two data is the activity intensity data.

The computing module 43 can further search out the GHG emission factor (i.e., the second GHG emission factor) used for verification from the verification database 36 based on the search criteria, and then according to the calculation conditions and according to the calculation categories such as, but not limited to, organizational boundary 333 and operational boundary 334 shown in FIG. 5, calculate GHG emission value (i.e., a second GHG emission value) from all direct or indirect emission sources of the verified unit end. The GHG emission value can be calculated by, for example, the emission factor method (emission value=activity intensity data×emission factor×GWP).

In addition, the computing module 43 can also do unit conversion of the data in the inventory items based on the AI learning data in the verification database 36, such as but not limited to converting the value in liters to the value in milliliters.

Even more, the computing module 43 can calculate a plurality of emission subtotals (i.e., second emission subtotals) used for verification belonging to different GHG inventory categories, and sum these second emission subtotals to calculate a total emission value (i.e., second total emission value) used for verification. The second emission subtotals for the respective GHG inventory categories are generated by the computing module 43 by adding up the second GHG emission value belonging to the GHG inventory categories and corresponding to the sampled inventory items, as well as the first GHG emission value belonging to the GHG inventory categories and corresponding to unsampled inventory items.

Therefore, by using the computing module 43, the auxiliary verification system of the invention can correctly calculate the GHG emission value used for verification by selecting a more appropriate GHG emission factor and correct data unit, which can improve the verification accuracy of the inventory data.

The verification module 44 can be configured to check whether the GHG emission value (i.e., the first GHG emission value) of an inventory item is consistent with the GHG emission value used for verification. The verification module 44 can also check whether the GWP value (i.e. the first GWP value) of the inventory item is consistent with the GWP value (i.e. the second GWP value) in the plurality of validation data of the verification database 36 used for verification, and whether the GHG emission factor of the inventory item is consistent with the GHG emission factor used for verification. In addition, the verification module 44 can search the validation data corresponding to the remaining data fields of the inventory items from the verification database 36, and check whether the remaining data fields are consistent with the corresponding validation data. Moreover, the verification module 44 can also verify whether the plurality of supporting data in the supporting documents match the plurality of supporting fields corresponding to the supporting data in the plurality of data fields of the inventory items.

In addition, the verification module 44 can also check whether the first emission subtotal and the second emission subtotal belonging to the same GHG inventory category are consistent, and whether the first total emission value and the second total emission value are consistent. For a correct inventory list, the first emission subtotal in a GHG inventory category should be the sum of the GHG emission value of all inventory items in that GHG inventory category, and the total emission value in the inventory list should be the sum of the first emission subtotals in all GHG inventory categories. Similarly, the correct investigation report should list all the statistical data for the correct inventory list.

The compiling module 45 can compile the verification results of the verification module 44 into an on-site verification list, which can be used as the basis for on-site verification. The compiling module 45 can also use AI technology (e.g. but not limited to large language model) to collect the verification results of the verification report, the inventory list and the verification results of the verification module 44 into a verified verification report and a verified inventory list for subsequent issuing of the verification certification.

Figure 21A:
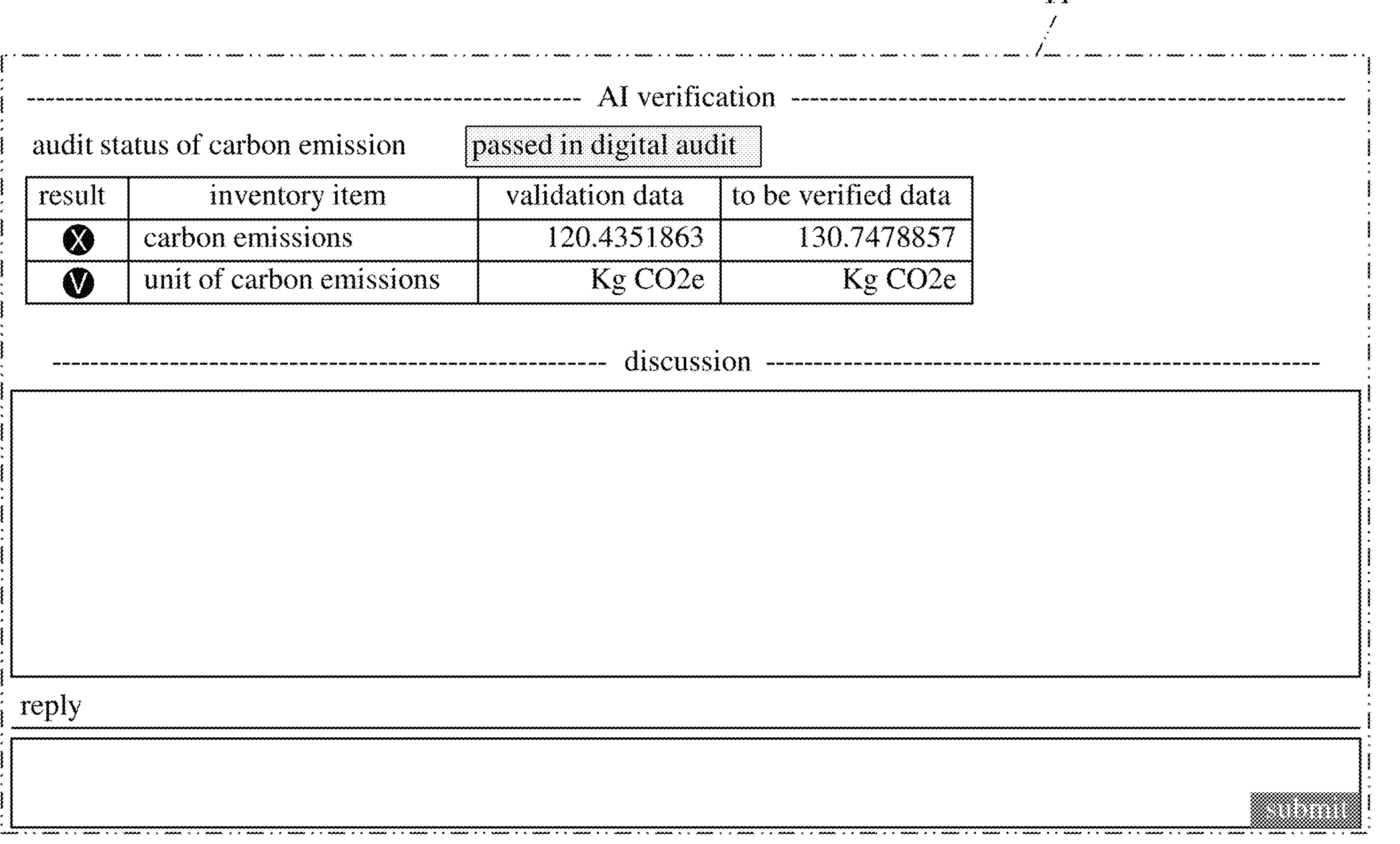
Figure 21B:
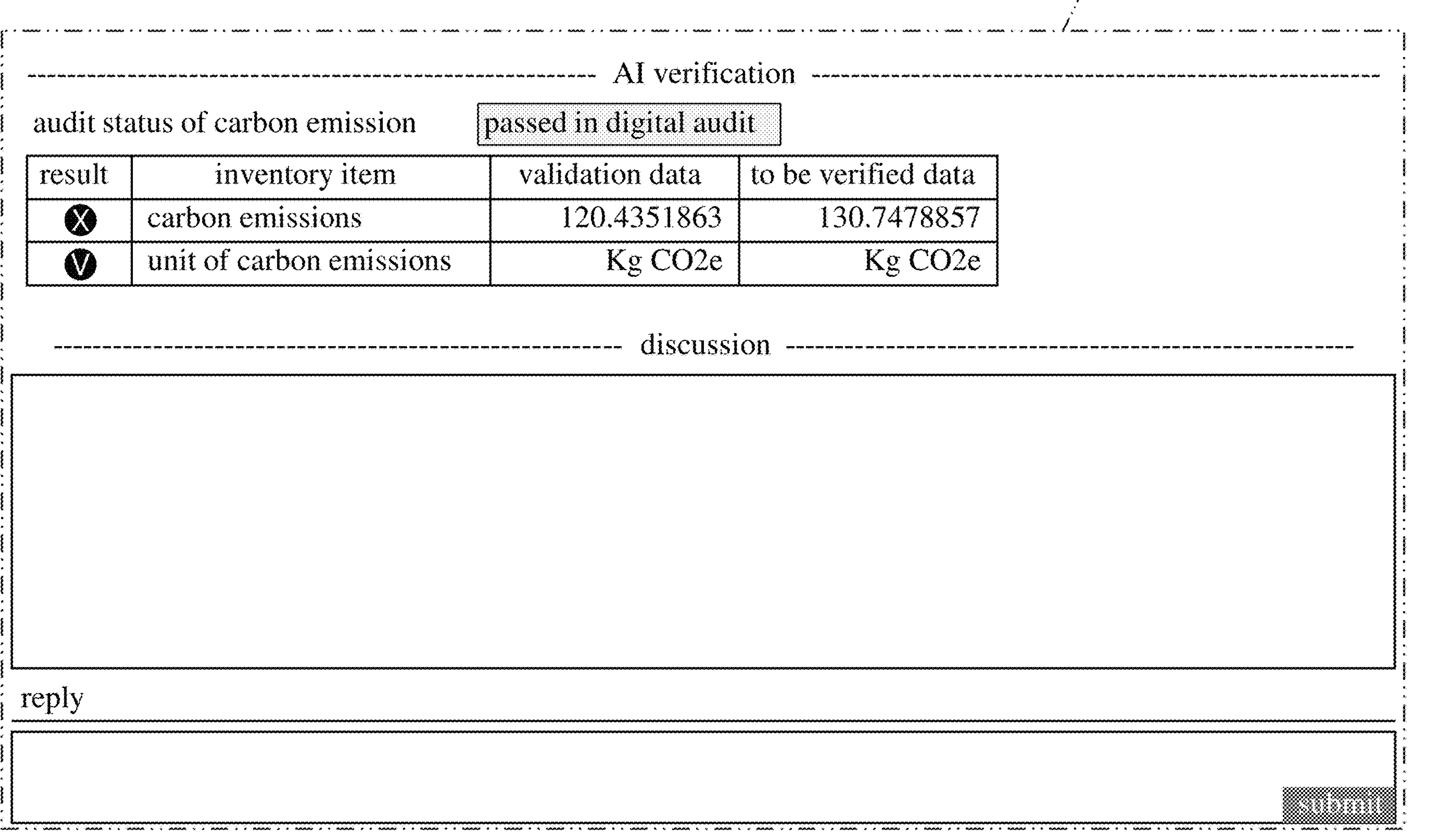
FIG. 21B is a schematic of a user interface provided to the verified unit end by an auxiliary verification system according to an embodiment of the invention.

The interactive platform module 46 provides interactive pages (as shown in FIG. 17) to the verified unit end and the verifying unit end through the user interfaces 11 and 12 respectively to achieve interaction between the two parties, such as but not limited to: allowing the verified unit end to explain on the verified records with errors, send supplementary supporting documents, fill in supplementary data, correct errors, etc.; Allowing the verifying unit end to reply or manually recheck the verified unit end's explanation, supplementary supporting documents, supplementary data, correction of errors, etc.; Allowing the verifying unit end to ask the verified unit end about the unrecognizable parts of the supporting documents; Allowing the verified unit end to confirm and reply on the unrecognizable parts of the supporting documents; Or carry out other tasks that require discussion between both parties in the verifying process. For example, the user interface 11 in FIG. 21A and the user interface 12 in FIG. 21B show fields that can be discussed and responded to by both parties to clarify and explain what is wrong or needs to be clarified.

The conversion module 47 can be connected to the storage 50 via information and can perform language translation or synonym conversion on the text specified in the inventory item based on the AI learning data of the verification database 36.

The following is an exemplary description of a verifying method of an auxiliary verification system based on an embodiment of the invention for the raw data. This verifying method is based on the international GHG carbon footprint verification standards (e.g., but not limited to IS014064 or IS014067) and in accordance with the GHG verification guidelines (e.g., but not limited to the GHG verification Guidelines issued by the Environmental Protection Department of Taiwan) issued by the country or region where the verifying unit end is located.

Step S101: The verified unit end sends the to-be-verified information (including the verification report, the inventory list and the raw data) compiled on the digital platform of GHG inventory to the verified unit end through the network.

Step S102: recording, by the processor 40 at the verifying unit end, the to-be-verified information in the report database 53 in storage 50 after receiving it.

Step S103: setting, by the verifying unit end, a sampling rate or a sampling number by the sampling module 41 through the pages provided in the user interface 11, as shown in FIG. 17.

Step S104: after receiving the sample rate or the sample number, obtaining, by the sampling module 41, the raw data from the report database 53, and randomly sampling from the raw data according to the sample rate or sample number, or sampling a plurality of inventory items according to a given rule.

Step S105: obtaining the sampled inventory items from the sampling module 41 and verifying or checking the sampled inventory items by the verification module 44. In addition, the verification module 44 also obtains the verification report and the inventory list from the report database 53, and verifies or checks the verification report and the inventory list.

Step S106: determining, by the verification module 44, whether there is an error in the to-be-verified information, according to the verification results and marking verified portion of the to-be-verified information, for example: marking inventory items with errors as wrong inventory items and marking inventory items without errors as correct inventory items. For example, the user interface 11 in FIG. 18 shows the verification result of the quantified uncertainty of each inventory item, listing whether it was sampled, whether the digital verifying passed, whether the manual verifying passed, and so on.

Step S107: When the to-be-verified information is correct, informed, by the verification module 44, and the compiling module 45 will compile the verification results of the verification module 44 into a verified verification report and a verified inventory list as documents for the subsequent certification process, through AI technology based on the verification report and the inventory list.

Step S108: When there is an error in the to-be-verified information, informed by the verification module 44, and the compiling module 45 will, through AI technology, compile the verification results of the verification module 44 into an on-site verification list which can be used as the basis for on-site verification. For example, in the user interface 11 of FIG. 22, the on-site verification list shows which inventory items have passed the digital verification, which inventory items have failed the digital verification, and which inventory items have passed the manual verification (that is, manual online verification). Therefore, the verifying unit end can select the inventory items that have failed the digital verification but passed the manual verification for on-site verification. Moreover, the verification module 44 informs the verified unit end to correct the incorrect part through the interactive platform module 46.

Step S109: after receiving the notification, the verified unit end can correct the incorrect part through the user interface 12 to generate updated to-be-verified information, and then upload the updated to-be-verified information back to the interactive platform module 46.

Step S110: The interactive platform module 46 can provide the to-be-verified information to the verification module 44 for automatic recheck upon reception of the updated to-be-verified information. Alternatively, when the interactive platform module 46 receives the updated to-be-verified information, the to-be-verified information can be displayed on the pages through the user interface 11 for manual re-verification by the verifying unit end, and the verification module 44 monitors the manual re-verification results on the user interface 11. For details about the automatic re-verification, see step S105.

Step S111: determining, by the verification module 44, whether there are still errors in the updated to-be-verified information based on the re-verification results.

Step S112: When there are no errors in the updated to-be-verified information, the verification module 44 notes the corrected part in the above on-site verification list according to the re-verification results to update the on-site verification list. The verifying unit end can conduct an on-site verification by using the on-site verification list.

On the contrary, when there are still errors in the updated to-be-verified information, the verification system executes steps S108, S109, S110, and S111 until the verification module 44 determines that there are no errors in the updated to-be-verified information from the re-verification result, then proceeds to Step 112.

Step S113: The verifying unit end records the on-site verification results in the verification results using the user interface 11 provided by the interactive platform module 46 to update the verification results. Also, the verification module 44 monitors the verification results of this update to determine whether there are errors in the marked part.

When the verification module 44 still finds an error in step S113, go back to step S108 and perform steps S108 through S112 until no problem is found.

When the verification module 44 has not found any problem in step S113, proceed to step S114.

Step S114: informed by the verification module 44, the compiling module 45 will compile the verification results of the verification module 44 into a verified verification report and a verified inventory list as documents for the subsequent certification process, through AI technology based on the verification report and the inventory list.

Figure 15:
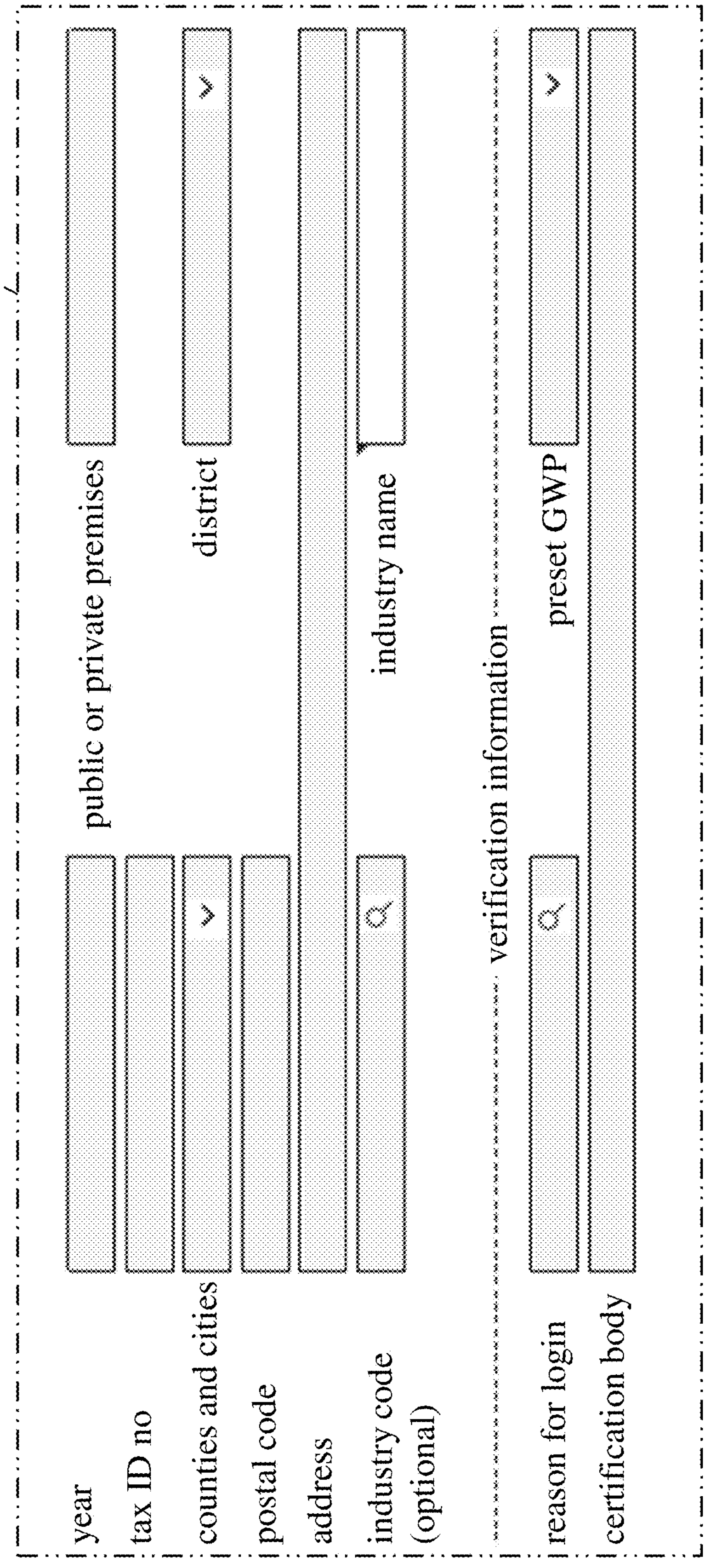

Although the above steps S101 to S114 are performed sequentially, the verifying method of the present invention is not limited thereto; In other embodiments, step S103 may instead be executed before or concurrently with step S102. Prior to step S104, the verifying unit end can also set the current year, region, GWP value, etc. as the search criteria for the GHG emission factor, and the GWP value is directly considered as validation data through the user interface 11 when establishing the verifying project, as shown in FIG. 15.

The verifying process for the raw data in step S105 of the verifying method is illustrated below in accordance with an embodiment of the invention.

Step S201: obtained by the verification module 44, all sampled inventory items.

Step S202: determined by the verification module 44 by using AI technology, whether there is any missing data in a sampled inventory item, such as but not limited to the lack of supporting documents or missing GHG emission factors, GHG emission value, factor sources, or other data that should be filled in. The verification module 44 identifies all data fields in the inventory item and then determines whether there is any missing data in the inventory item.

When the verification module 44 determines in step S202 that there is no missing data in that sampled inventory item, the character capturing module 42 is notified by the verification module 44 to perform step S203.

Conversely, when the verification module 44 determines in step S202 that there is at least one missing data in that sampled inventory item, it further marks the missing part in step S204 and informs the character capturing module 42 to perform step S203 after the marking is complete.

Step S203: recognized by the character capturing module 42 by using AI technology, the supporting documents to extract the specified characters and provide them to the verification module 44 and the computing module 43.

Step S205: Verified by the verification module 44 by using AI technology, after receiving the specified characters extracted from the character capturing module 42, whether the specified set of data fields (i.e., the supporting fields) in that sampled inventory item conforms to the supporting document, that is, to determine whether they conform to the specified characters extracted from the supporting document.

When the verification module 44 determines in step S205 that the specified set of data fields conforms to the supporting document, then proceed to step S206.

Conversely, when the verification module 44 determines in step S205 that any of the specified set of data fields does not conform to the supporting document, it further marks the non-conforming data fields in step S207 and proceed to step S206 after the marking is complete.

Step S206: determined by the verification module 44 by using AI technology, whether there is any error in other data fields. Other data fields are related to GHG emission factor and GWP category, such as, but not limited to, data fields including GWP values, GHG emission factors, activity data error levels, instrument calibration error levels, emission calculation parameter error levels, GHG uncertainty quantitative assessment, factor categories, factor sources, factor names, other GHG emission value associated with this sampled inventory item, or any combination thereof.

Taking verifying the data fields of "GHG emission value" as an example, the verification module 44 calculates the GHG emission value (i.e., the second GHG emission value) used for verification by using the computing module 43, and then verifies this data fields. The verifying process is exemplified in FIG. 13 below.

Step S301: The computing module 43 obtains the sampled inventory item from the sampling module 41, and uses AI technology to organize a search criteria from the sampled inventory item; Then, according to the search criteria, the computing module 43 searches out a pre-stored gas emission factor (i.e. the second gas emission factor) from the verification database 36 as part of the calculation conditions.

Step S302: The computing module 43 obtains the second gas emission factor and the GWP value as part of the calculation conditions, and also uses AI technology to select the data fields from the sampled inventory item for calculating activity intensity value as a part of the calculation conditions, so as to organize or establish the calculation condition used for verifying the GHG emission value.

Step S303: The computing module 43 uses the emission factor method above to calculate a GHG emission value (i.e., the second GHG emission value) used for verification and provides it to the verification module 44.

Step S304: the verification module 44 obtains GHG emission value (i.e., the first GHG emission value) from the data fields of the sampled inventory item.

Step S305: the verification module 44 determines or verifies or checks whether the first GHG emission value matches the second GHG emission value.

When the verification module 44 determines in step S305 that the two GHG emission values are different, it further determines in step S306 that the GHG emission value of the sampled inventory item is incorrect and marks the incorrect data fields.

On the contrary, when the verification module 44 determines in step S305 that the two GHG emission values are the same, it further determines in step S307 that the GHG emission value of the sampled inventory item is correct.

In this or other embodiment, before performing step S303, the computing module 43 may first obtain the data (i.e., AI learning data) required for unit conversion from the verification database 36 and convert unit of the activity intensity data.

Taking verifying the data fields of "gas emission factor" as an example, the verification module 44 can obtain the first gas emission factor from the data fields of the sampled inventory item, and the second gas emission factor from the computing module 43, and then check whether the two gas emission factors are the same or not, so as to further verify whether the data fields is correct or not.

Taking verifying the data fields of "GWP Value" (i.e., the first GWP value) as an example, the verification module 44 can obtain the first GWP value from the data fields of the sampled inventory item, obtain the GWP category based on this inventory item, obtain the second GWP value from the verification database 36 according to the GWP category, and then check whether the two GWP values are the same or not to further verify whether the data fields is correct.

When the verification module 44 determines in step S206 that no other data fields have errors, step S208 is performed.

Conversely, when the verification module 44 determines in step S206 that there is an error in any of the other data fields, step S209 is performed.

Figure 19:
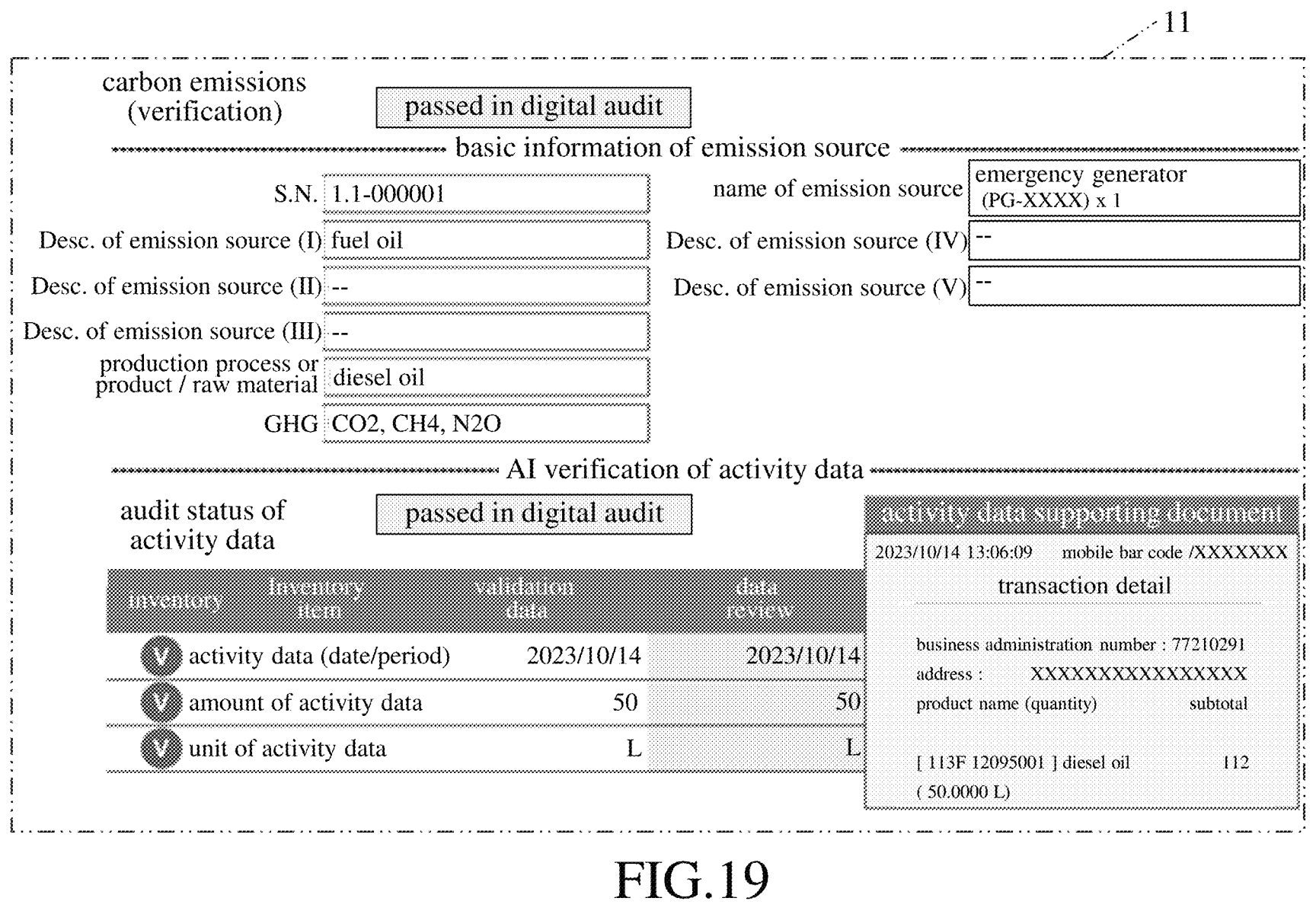

Step S208: since there are no errors in this sampled inventory item, the verification module 44 marks this sampled inventory item as the correct verified inventory item and proceeds to step S210. When the user interface 11 in FIG. 19 shows that the data fields of "Activity Data (Date/interval)," "Activity data quantity" and "activity data Unit" of an inventory item are all correct according to the marking results of the verification module 44, which means that the supporting data in the supporting document which is a screenshot of e-invoice, matches.

Step S209: the verification module 44 marks the incorrect data fields, and because there are errors in this sampled inventory item, the verification module 44 marks this sampled inventory item as the incorrect verified inventory item. After the marking is complete, the verification module 44 proceeds to step S210. For example, the user interface 11 in FIG. 20 shows that the verification result for GHG $N_2O$ is incorrect while the verification results for $CO_2$ and $CH_4$ are correct based on the marking results of the verification module 44. For example, in FIG. 21A and FIG. 21B, the verification result of carbon emission of a certain inventory item is wrong, but the verification result of carbon emission unit is correct.

Step S210: the verification module 44 determines whether each sampled inventory item has been verified.

When the verification module 44 determines in step S210 that each sampled inventory item has been verified, step S106 is performed.

Conversely, when verification module 44 determines in step S210 that there is at least one sampled inventory item that has not yet been verified, it returns to step S202 to verify the remaining sampled inventory items.

Finally, when the raw data has been verified, the verification of the verification report and the inventory list can be produced.

Similarly, examples of the verification of the verification report and the inventory list in step S105 are illustrated below. The verification report and the inventory list generally contain a first total emission value and a plurality of first emission subtotals belonging to different GHG inventory categories.

First, the computing module 43 calculates a plurality of second emission subtotals belonging to these GHG inventory categories and aggregates these second emission subtotals to figure out a second total emission value. The second emission subtotal of each GHG inventory category is generated by adding up the second GHG emission of each sampled inventory item belonging to this GHG inventory category and the first GHG emission of each unsampled inventory item belonging to this GHG inventory category with the computing module 43.

Next, the verification module 44 checks whether the first emission subtotal and the second emission subtotal belonging to the same GHG inventory category are consistent, and checks whether the first total emission value and the second total emission value are consistent.

When the first emission subtotal and the second emission subtotal belonging to the same GHG inventory category are the same, it means that the statistics of GHG emission of that GHG inventory category in the inventory list are correct, and it also means that the statistics of GHG emission of that GHG inventory category recorded in the verification report are correct; Otherwise, it means that the statistics of GHG emission of that GHG inventory category in the inventory list are incorrect, and it means that the statistics of GHG emission of that GHG inventory category recorded in the verification report are incorrect. When the first total emission value is the same as the second total emission value, it means that the statistics of the total emission value in the inventory list are correct, and also means that the total emission value recorded in the verification report is correct; Otherwise, they are incorrect.

Finally, when the verification of the verification report and inventory list is completed, the verification module 44 marks the incorrect and correct parts based on the verification results.

When the auxiliary verification system completes the verifying of the to-be-verified information, it can use AI technology (such as but not limited to a large language model) to automatically compile a verified verification report and a verified inventory list according to the correct to-be-verified information, which can be used as documents for the subsequent certification process.

In the present invention, the auxiliary verification system can allow the digital platform of GHG inventory to provide automatic verification service by using API communication network when establishing each inventory item, so as to confirm whether the emission source and activity data of that inventory item are established correctly. If there is an abnormality, the digital platform of GHG inventory allows the verified unit end to correct the data on the page provided by the interactive platform module 46 via the user interface 12.

In the present invention, at least part of the auxiliary verification system (e.g., the character capturing module 42, the computing module 43, the verification module 44, the conversion module 47, and the verification database 36) may be embedded in the digital platform of GHG inventory and updated or modified periodically or infrequently by the manager of the auxiliary verification system via an API communication network.

What is claimed is:

1. An auxiliary verification system of greenhouse gas (GHG) inventory, allowing a verified unit end to link to for receiving and verifying raw data in the GHG inventory that is provided by the verified unit end, is completed and comprises a verification report summarizing the raw data, the raw data including inventory items each including a plurality of data fields, the plurality of data fields including a first GHG emission value, a first global warming potential (GWP) and a first GHG emission factor, and the auxiliary verification system comprising:

a verification database for pre-storing a plurality of pieces of validation data and predefined associations therebetween, and the plurality of pieces of validation data being organized in a data structure that is indexed based on the predefined associations and field names of the plurality of data fields;

a computing module connected to the verification database and configured to establish a first search criteria based on the portion of the plurality of data fields of the inventory item through AI technology and then search for a second global warming potential (GWP) and a second GHG emission factor from the plurality of pieces of validation data according to the first search criteria, in order to calculate a second GHG emission value; and a verification module connected to the computing module and configured to:

identify the first GWP, the first GHG emission factor and the other data fields in the inventory item;

check whether the first GWP is the same as the second GWP;

check whether the first GHG emission factor is the same as the second GHG emission factor;

check whether the first GHG emission value of the inventory item meets the second GHG emission value;

for each of the other data fields in the inventory item, establish a second search criteria based on at least two data fields of the plurality of data fields in the inventory item through the AI technology, and then search for other piece of validation data from the plurality of pieces of validation data according to the second search criteria, to check whether this other data field matches the searched other piece of validation data; and generate a verification result for the inventory item according to checking results of the plurality of data fields in the inventory item, thereby confirming correctness of the verification report.

2. The auxiliary verification system of GHG inventory as claimed in claim 1, wherein the other data field is an activity data error level, an instrument calibration error level, an emission calculation parameter error level, a GHG uncertainty quantitative assessment, a category of emission factor, a source of emission factor or a name of emission factor.

3. The auxiliary verification system of GHG inventory as claimed in claim 1, wherein the inventory item further includes a supporting document, the supporting document includes a plurality of pieces of supporting data, and the plurality of data fields of the inventory item further includes a plurality of supporting fields corresponding to the plurality of pieces of supporting data;

the auxiliary verification system further includes a character capturing module which is connected to the verification database and the verification module, the character capturing module obtains the supporting document of the inventory item and recognizes characters in the supporting document, and then uses artificial intelligence (AI) technology to extract the plurality of pieces of supporting data from the recognized characters based on AI learning data in the verification database, and provide the extracted pieces of supporting data to the verification module; and the verification module checks whether the plurality of supporting fields of the inventory item match the extracted pieces of supporting data.

4. The auxiliary verification system of GHG inventory as claimed in claim 3, further comprising:

a conversion module, connected to the verification database, the character capturing module, the computing module and the verification module, wherein the conversion module obtains the inventory item and uses the AI technology to perform language translation or synonym conversion on the inventory item based on the AI learning data in the verification database, and then, provides the results of the language translation or synonym conversion to the computing module and the verification module.

5. The auxiliary verification system of GHG inventory as claimed in claim 3, wherein the computing module utilizes the AI technology to change unit of data for the inventory item and the extracted characters based on the AI learning data in the verification database.

6. The auxiliary verification system of GHG inventory as claimed in claim 1, wherein the auxiliary verification system further comprises a sampling module configured to sample the inventory items based on a sampling rate or a sampling number, provide the computing module with the sampled inventory items for calculation of GHG emission value, and provide the verification module with the sampled inventory items for verification of the sampled inventory items.

7. The auxiliary verification system of GHG inventory as claimed in claim 6, wherein the auxiliary verification system also receives and verifies the verification report and an inventory list of the GHG inventory provided by the verified unit end, and the verification report and the inventory list both contain a first total emission value and first emission subtotals that belongs to different GHG inventory categories;

to verify the verification report and the inventory list from the verified unit end, the computing module calculates second emission subtotals that respectively belong to the GHG inventory categories, and calculates a second total emission value by summing up the second emission subtotals; and the verification module checks whether the first and second emission subtotals that belong to the same GHG inventory category, are consistent, and checks whether the first total emission value and the second total emission value are consistent.

8. The auxiliary verification system of GHG inventory as claimed in claim 7, further comprising: a compiling module connected to the verification module, for compiling verification results of the verification module into a verified verification report and a verified inventory list through AI technology, based on the verification report and the inventory list of the GHG inventory.

9. The auxiliary verification system of GHG inventory as claimed in claim 1, further comprising: an interactive platform module connected to the verification module, being communicable with the verified unit end and configured to notify the verified unit end of a demand for correcting an incorrect inventory item when the incorrect inventory item exists in verification results of the verification module, and allow manual recheck to be performed by a verifier on an inventory item or provide the corrected inventory item to the verification module for automatic recheck when receiving the corrected inventory item.

10. The auxiliary verification system of GHG inventory as claimed in claim 9, wherein the inventory item further comprises a supporting document, the auxiliary verification system further comprises a character capturing module connected to the interactive platform module, the character capturing module obtains the supporting document of the inventory item and recognizes characters in the supporting document, the interactive platform module transfers unrecognizable part of the supporting document from the character capturing module to the verified unit end, and then provides a character confirmation content to the character capturing module when receiving the character confirmation content from the verified unit end, and the character confirmation content is a result of confirmed characters for the unrecognizable part by the verified unit end.

* * * * *